US011613881B2

(12) United States Patent
Nguyen et al.

(10) Patent No.: US 11,613,881 B2
(45) Date of Patent: Mar. 28, 2023

(54) PLUMBING PRODUCTS KIT

(71) Applicant: Fluidmaster, Inc., San Juan Capistrano, CA (US)

(72) Inventors: Jack Nguyen, San Clemente, CA (US); Justin Storm, Laguna Hills, CA (US); Michael Lagasse, Laguna Hills, CA (US); Corinne AndersonSchoepe, San Juan Capistrano, CA (US); William Martin, San Clemente, CA (US); Mike Robbins, Eastvale, CA (US); David McFarland, San Juan Capistrano, CA (US); Christopher Podolak, Lake Forest, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 313 days.

(21) Appl. No.: 16/793,960

(22) Filed: Feb. 18, 2020

(65) Prior Publication Data
US 2020/0263403 A1    Aug. 20, 2020

Related U.S. Application Data

(60) Provisional application No. 62/810,873, filed on Feb. 26, 2019, provisional application No. 62/806,554, filed on Feb. 15, 2019.

(51) Int. Cl.
*E03D 1/30* (2006.01)
*B25B 23/16* (2006.01)
(Continued)

(52) U.S. Cl.
CPC ................ *E03D 1/30* (2013.01); *B25B 13/02* (2013.01); *B25B 13/48* (2013.01); *B25B 23/16* (2013.01)

(58) Field of Classification Search
CPC ....... B25B 13/00; B25B 13/003; B25B 13/02; B25B 13/04; B25B 13/06; B25B 13/10;
(Continued)

(56) References Cited

U.S. PATENT DOCUMENTS 1,895,280 A * 1/1933 Currie ..................... B25B 13/04
81/118
4,738,169 A * 4/1988 Wyka ...................... B25B 13/04
81/492
(Continued)

FOREIGN PATENT DOCUMENTS

TW         200808497 A  *  2/2008  ............. B25B 13/02

OTHER PUBLICATIONS

Keeny, Keeny Manufacturing Universal Toilet Tank Repair Kit Installation Tutorial, YouTube (online video) Jun. 16, 2009 (retrieved Sep. 28, 2020), 4 pages, retrieved from <https://www.youtube.com/watch?v=8RtaAjgbS8c>.

(Continued)

*Primary Examiner* — David B. Thomas
(74) *Attorney, Agent, or Firm* — Greenberg Traurig, LLP

(57) ABSTRACT

This disclosure describes a kit comprising component for removing, replacing, and/or sealing toilet parts. In some embodiments, the kit comprises a flush valve assembly, fill valve assembly, a handle assembly, two tools, two gaskets, and packaging that also serves as one or more water containers. In some embodiments, the two gaskets are two conventional gaskets that can be combined to make a third gasket. In some embodiments, the combination of the two gaskets allows the creation of a synergistic gasket for sealing a tank-to-bowl interface than neither gasket could seal individually.

76 Claims, 12 Drawing Sheets

(51) Int. Cl.
*B25B 13/48* (2006.01)
*B25B 13/02* (2006.01)

(58) Field of Classification Search
CPC ......... B25B 13/12; B25B 13/14; B25B 13/16; B25B 13/48; B25F 1/00; B25F 1/003; B25F 1/02; B25F 1/04; E03D 1/30; E03D 3/00; E03D 3/02; E03D 3/04; E03D 3/06; E03D 3/08
See application file for complete search history.

(56) References Cited

U.S. PATENT DOCUMENTS

| | | | |
|---|---|---|---|
| D296,292 S | 6/1988 | Schoepe | |
| 4,973,402 A * | 11/1990 | Johnson | E03D 5/00 210/488 |
| 5,345,636 A * | 9/1994 | Lamons | B25B 13/12 7/164 |
| 5,794,661 A * | 8/1998 | Natalizia | F16K 15/147 137/859 |
| 9,050,711 B1 * | 6/2015 | Mazzarella | B25F 1/04 |
| 10,907,337 B1 * | 2/2021 | Schmidt | E03D 11/135 |
| 2006/0150783 A1 * | 7/2006 | Thompson | B25B 13/06 81/437 |
| 2006/0174730 A1 * | 8/2006 | Stewart | B25B 13/505 81/98 |
| 2006/0243102 A1 * | 11/2006 | Vines | B25B 13/481 81/124.2 |
| 2007/0006690 A1 * | 1/2007 | Foster | B25B 13/02 81/124.2 |
| 2008/0005830 A1 | 1/2008 | Er et al. | |
| 2008/0066584 A1 * | 3/2008 | Vines | B25B 13/481 81/124.2 |
| 2010/0229294 A1 * | 9/2010 | Chen | E03D 1/142 4/324 |
| 2010/0313349 A1 * | 12/2010 | Bizon | E03D 1/30 4/415 |
| 2014/0189958 A1 * | 7/2014 | Martin, Sr. | B25B 13/58 7/138 |
| 2016/0002903 A1 * | 1/2016 | Grover | E03D 1/306 4/405 |
| 2016/0102450 A1 | 4/2016 | Jensen et al. | |
| 2016/0312458 A1 * | 10/2016 | Mehari | E03D 11/16 |
| 2019/0169825 A1 * | 6/2019 | Swart | E03D 1/26 |

OTHER PUBLICATIONS

Korky Toilet Repair, How to install a Large 3" Flush Valve and Gasket Kit by Korky, YouTube (online video), May 13, 2016 (retrieved Sep. 28, 2020), 4 pages, retrieved from <https://www.youtube.com/watch? V=g1MbPRHPbYA>.

Korean Intellectual Property Office, International Search Report and Written Opinion, Issued in connection to PCT/US2020/018674, 13 pages; Korea.

* cited by examiner

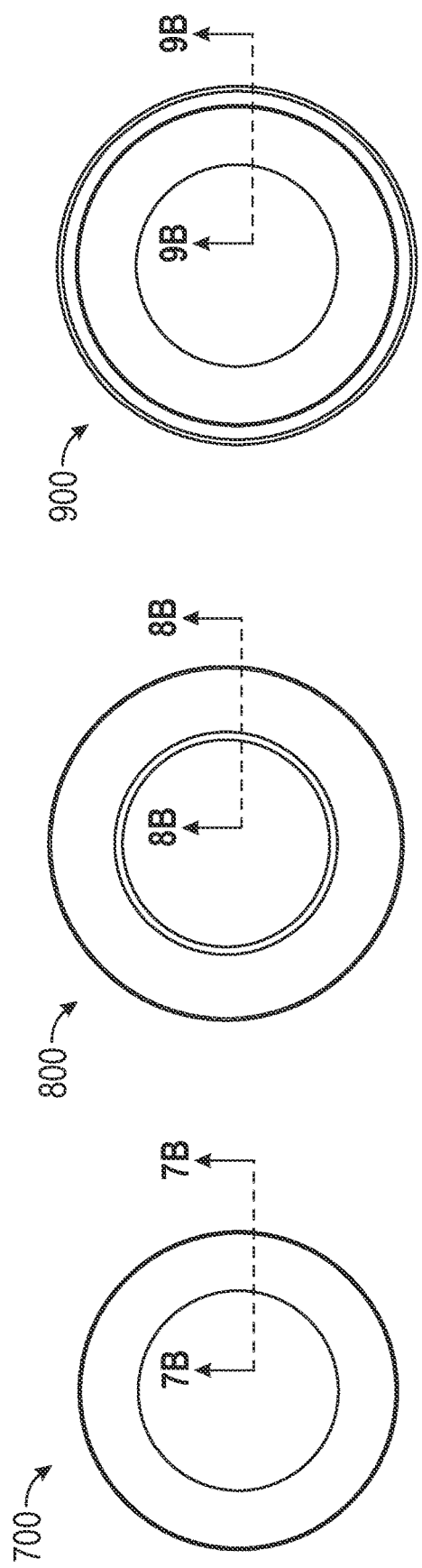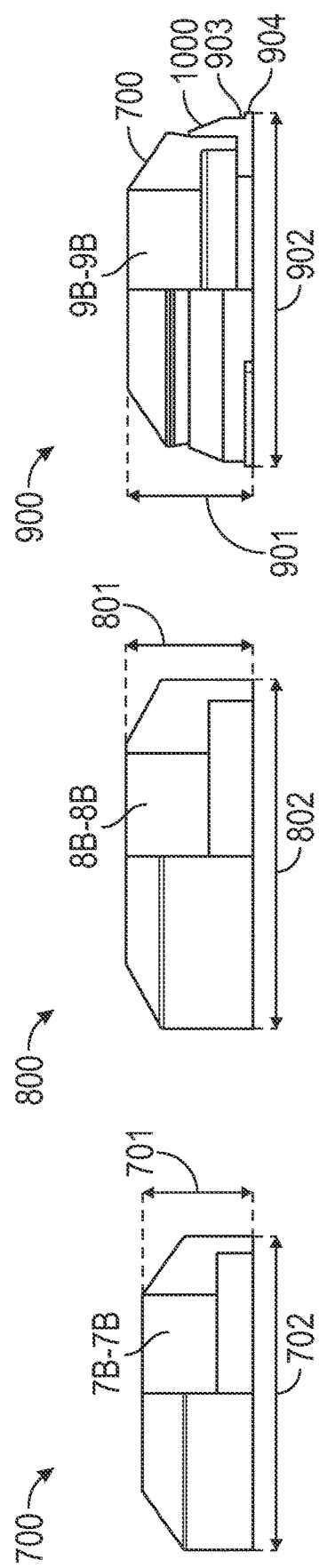

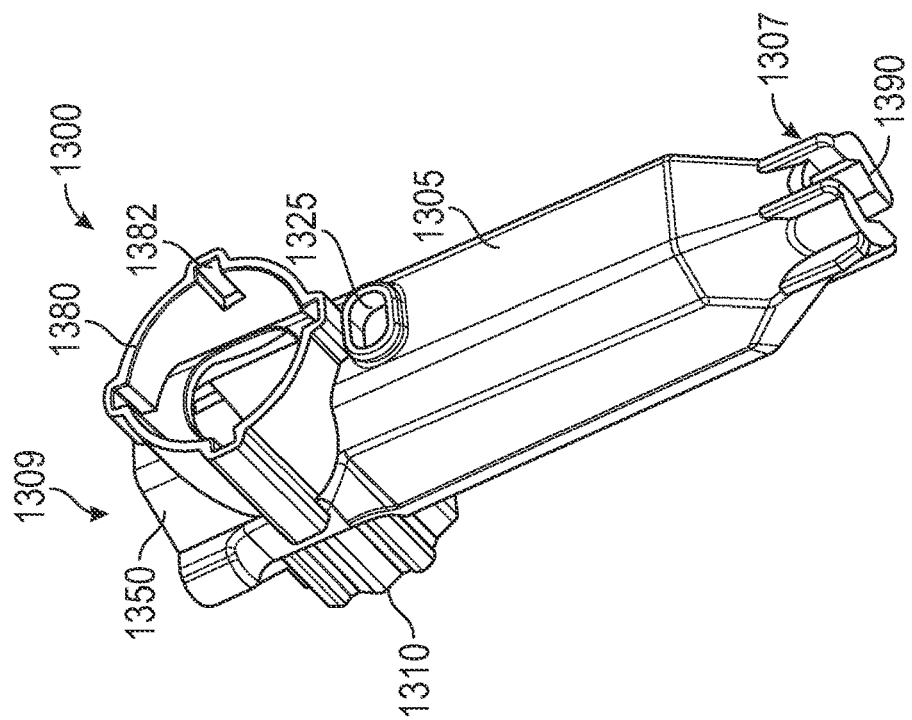
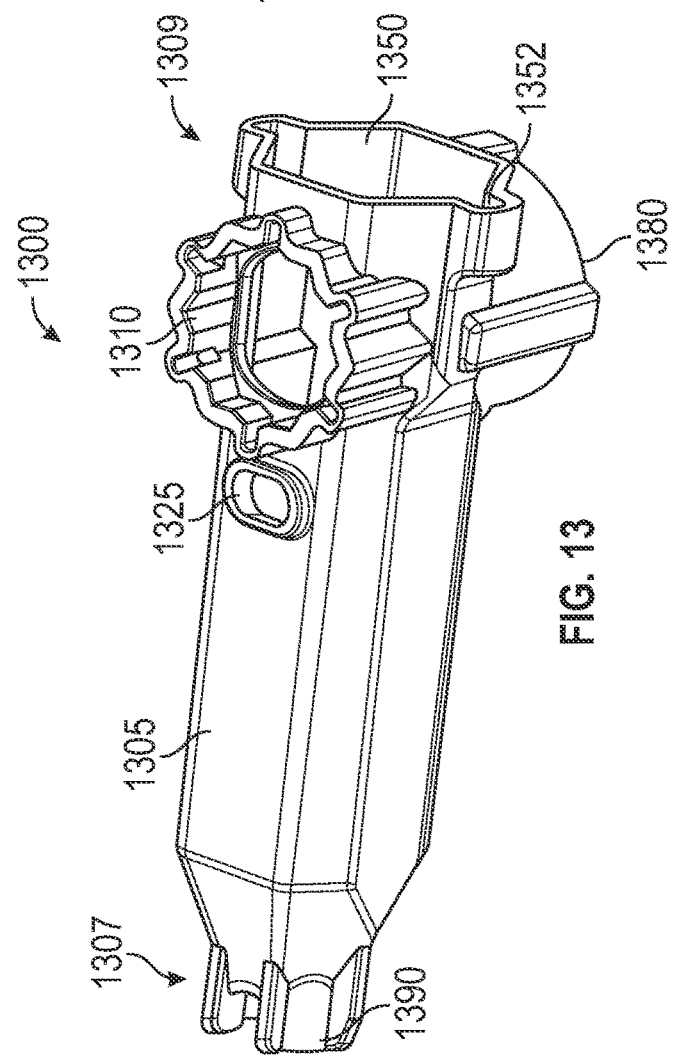

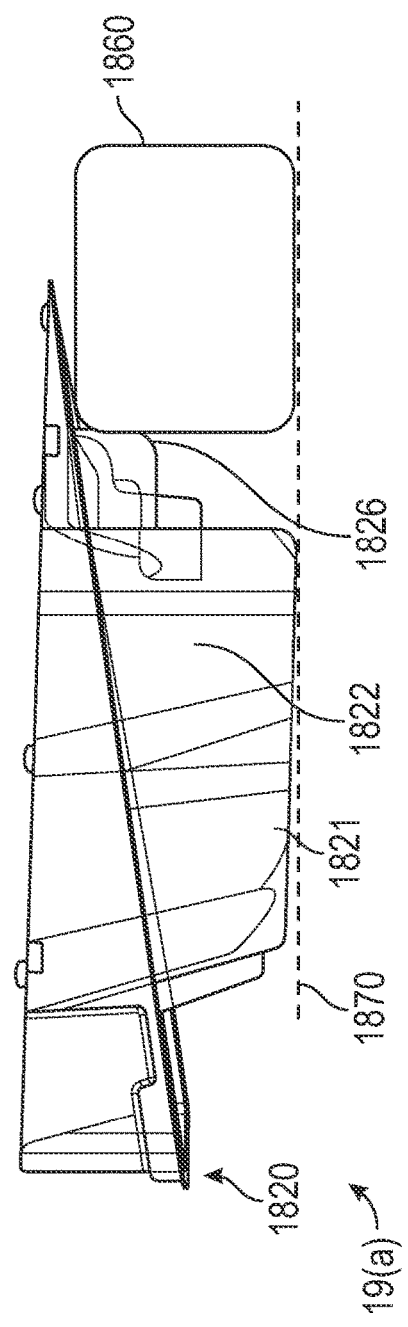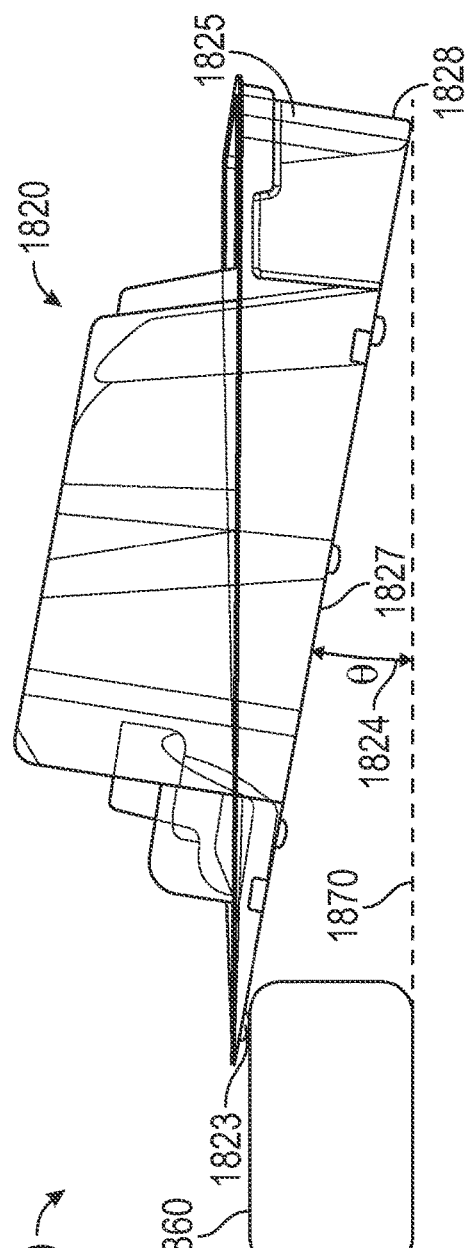
FIG. 19

PLUMBING PRODUCTS KIT

CROSS-REFERENCE TO RELATED APPLICATIONS

This application claims the benefit of and priority to U.S. Provisional Application No. 62/806,554, filed Feb. 15, 2019, entitled "Tank-to-Bowl Gasket System and Method" and U.S. Provisional Application No. 62/810,873, filed Feb. 26, 2019, entitled "Installation Tools for Toilet Tank, Fill and Flush Valves, and Method of Use", the entire contents of which are incorporated herein by reference.

BACKGROUND

Toilets are a common and fixed aspect of everyday life. They provide a mechanism for the safe disposal of human waste so that areas used for such a purpose can be located inside a home. Without the conventional toilet, communicable diseases such as cholera, typhoid, hepatitis, polio, cryptosporidiosis, ascariasis, and schistosomiasis are easily spread.

A typical toilet configuration includes a toilet tank and a toilet bowl. The toilet tank is typically at a level above the bowl so that water from the tank is supply to bowl under pressure. A flush valve is used to feed water through a tank-to-bowl interface which includes a hole at the bottom of the tank that aligns with a hole on the top of the bowl. After a flush has occurred, a fill valve connected to a supply line outside of the tank controls a refilling operation of the tank to place the tank in condition for the next flush.

Typically, both the fill valve and the flush valve have some portion that pass through the bottom of the tank, such as a threaded stem that connects to a threaded nut. Components on the inside of the tank are secured in place by connecting a hexagonal or wing nut to a threaded portion of the fill and/or flush valve stem that extend outside the tank. In the case of the flush valve, the stem that extends outside the tank directs the water through the tank-to-bowl interface. Without a proper seal, the pressure created by the height of the column of water in the tank can cause water to exit through any exposure to atmosphere at these interfaces.

In conventional toilets, a gasket is used at the fill valve, flush valve, and tank-to-bowl interface to prevent leakage. The majority of conventional 2-piece toilets have one of three types of tank-to-bowl gasket: a standard style, a Kohler® style with three mounting bolt grommets that extend to triangular points, or a Gerber® style which is similar to a standard style but thicker and taller. The materials used for gaskets tend to wear out over time and intermittently require replacement, as do the fill and flush valve components. In addition, current government regulation and environmentally aware consumers are driving demand for increased efficiency during flushing operations, which often requires replacing all components in a conventional toilet. However, there are several different configurations for securing fill and flush valves in places as well as different gasket sizes for sealing the tank-to-bowl interface. These differences result in additional cost and frustration for the consumer as often it is not discovered until a toilet is disassembled that a particular tool or gasket is required to facilitate an upgrade or repair. Another common scenario is that the tool, fill valve, flush valve, or tank-to-bowl gasket purchased is not the correct version for a particular brand of toilet.

Therefore, there is a need for a single universal kit that provides the necessary components to upgrade all conventional toilets.

SUMMARY

Some embodiments describe a kit for conventional toilet tank repair. In some embodiments, the kit includes one or more gaskets, fill valves, flush valves, installation tools, nuts, bolts, washers, tank levers, tank buttons, gaskets, and/or water containers. In some embodiments, two or more gaskets are combined to form a third gasket. In some embodiments, the two or more gaskets are conventional gaskets. In some embodiments, the two or more gaskets are non-conventional gaskets configured to seal conventional tank holes and/or interfaces. In some embodiments, two or more gaskets are included together with one or more other toilet components to form a kit.

In some embodiments, the kit includes and/or is connected to one or more of three gaskets. In some embodiments, the three gaskets include a standard gasket, a Kohler® gasket, and a Gerber® gasket. As used herein in some embodiments, a conventional standard gasket will also be referred to as short gasket; a conventional Kohler® gasket will be referred to as a triangle gasket; and a conventional Gerber® gasket will also be referred to as a tall gasket. In some embodiments a Kohler® gasket may not have a triangle shape, but instead have rubber grommets distributed about triangular points at some distance from and connected to a circular gasket, as is known in some conventional Kohler® gasket embodiments.

In some embodiments, references to a first gasket, a second gasket, and a third gaskets are references to generic gaskets. In some embodiments, a first gasket has one or more features, configurations, and/or structures associated with a standard gasket. In some embodiments, a second gasket has one or more features, configurations, and/or structures associated with a Kohler® gasket. In some embodiments, a third gasket has one or more features, configurations, and/or structures associated with a Gerber® gasket and/or a synergistic gasket. In some embodiments, a synergistic gasket is a novel gasket comprising one or more portions of the first and second gaskets. In some embodiments, a synergistic gasket can seal the same tank-to-bowl interface as a Gerber® gasket.

In some embodiments, the kit includes a standard gasket and a Kohler gasket only. Through innovation and insight, Applicant has discovered a new and useful apparatus that is formed by a method combining a conventional standard gasket and a Kohler gasket to form a new gasket structure that seals a conventional Gerber® tank-to-bowl interface according to some embodiments. In some embodiments, this previously unknown method of assembly includes the step of (1) placing a standard gasket within a Kohler gasket. In some embodiments, the resulting product formed by this process can seal a Gerber® tank-to-toilet interface, where the individual standard or Kohler® gaskets would not provide a sufficient seal to stop leakage at the tank-to-bowl interface. A kit including a standard gasket and a Kohler® gasket that facilitates the method of assembly is provided according to some embodiment.

In some embodiments, a method of installation includes one or more of the steps of: (1) providing a standard gasket and a Kohler® gasket; (2) placing the Kohler® gasket on a flush valve pipe; (3) placing flush valve fastener on the flush valve pipe; (4) placing the standard gasket on the flush valve pipe; (5) positioning the standard gasket over the flush valve nut and between the walls of the Kohler® gasket. In some embodiments, a step of removing the rubber grommets and/or triangle projections from the Kohler® gasket is also provided. In some embodiments, the resulting product is one where the flush valve fastener is positioned between one or more walls of the standard gasket and the Kohler® gasket. In some embodiments, the resulting product is one where at least a portion of an outer wall of the standard gasket is in contact with an inner wall of the Kohler® gasket. In some embodiments, the width (and/or diameter) of the resulting product is substantially the same as a Gerber® gasket. In some embodiments, the total height of the resulting structure is substantially the same as a Gerber® gasket.

Additional, in some embodiments, the method of installation includes the additional step removing one or more rubber grommets from the Kohler® gasket. In some embodiments, removing the one or more rubber grommets occurs before the step of placing the Kohler® gasket on a flush valve threaded pipe. In some embodiments, removing the one or more rubber grommets occurs after the step of placing the Kohler® gasket on a flush valve threaded pipe. In some embodiments, removing the one or more rubber grommets occurs at any time before the step of securing the tank to the bowl.

In some embodiments, the rubber grommets are not removed at all. In some embodiments, the rubber grommets are not removed when their presence does not interfere with the step of securing the tank to the bowl (e.g., the rubber grommets are not sandwiched between surfaces of the tank and the bowl during installation. In some embodiments, a method of installation includes using the rubber grommets to seal one or more holes in a tank. In some embodiments, a removed rubber grommet can be used in conjunction with a bolt and a nut to seal one or more holes in a tank. In some embodiments, a non-conventional gasket that seals a Kohler® tank-to-bowl interface but does not comprise grommets and/or a triangle shape is provided in a kit. In some embodiments, gaskets, grommets, and/or seals for one or more for holes in a tank intended for a Kohler® gasket is provided in a kit. In some embodiments, the flush valve fastener is sealed between the non-conventional gasket and the standard gasket in the same fashion as the flush nut is sealed between the Kohler® gasket and the standard gasket as described herein.

In some embodiments, a kit including a standard gasket and a Kohler® gasket constitutes a combination of parts that allows a user to assemble the novel product described herein. In some embodiments, a kit comprising a standard gasket and a Kohler gasket results in a synergistic combination where the standard conventional gasket and the Kohler® conventional gasket can be used individually to seal an interface, or combined to seal an interface that neither the standard or Kohler® gasket could seal individually. In some embodiments, a kit comprising a standard gasket and a Kohler® gasket forms a functional unity through a purpose-directed application.

In some embodiments, a kit including a standard gasket, a Kohler® gasket, and a Gerber® gasket constitutes a combination of parts that allows a user to seal three different types of toilets-to-bowl interface, or two Gerber® tank-to-bowl interfaces. By proving three different types of gaskets, where two gaskets can be used to form the third, professionals and/or those performing multiple toilet upgrades have two spare gaskets (i.e., the standard and Kohler®) that can be used on three different types of toilets after the third gasket (i.e., the Gerber®) and/or other toilet components listed herein have been installed. In some embodiments, the standard and Kohler® gaskets can be used in combination as described herein in place of the Gerber® gasket, which results in only a single gasket (i.e., the Gerber® gasket) being left as a spare. In some embodiments, this saves space, waste, and/or cost associated with inventory. In some embodiments, a kit comprising a standard gasket, Kohler® gasket, and a Gerber® gasket forms a functional unity through a purpose-directed application.

In some embodiments, a kit including a standard gasket and a Kohler® gasket includes a third conventional and/or non-conventional gasket that is not a Gerber® gasket. In some embodiments, a kit including a standard gasket, Kohler® gasket, and a Gerber® gasket also includes a fourth conventional and/or non-conventional gasket that is not a Gerber® gasket. In some embodiments, the conventional and/or non-conventional gasket can be modified to fit two different types of tank-to-bowl interfaces. In some embodiments, the conventional and/or non-conventional gasket can be split and/or trimmed to fit two different types of tank-to-bowl interfaces. In some embodiments, the conventional and/or non-conventional can be timed to fit a Jicuuzzi® style toilet. In some embodiments, the third and/or fourth gasket is a Korky® gasket.

In some embodiments, the kit includes one or more gaskets for a 2-inch flush valve. In some embodiments, the kit includes one or more gaskets for 3-inch flush valve. In some embodiments, the kit includes one or more 2-inch and/or 3-inch flush valve gaskets. In some embodiments, the kit includes one or more gaskets for any conventional or non-conventional flush valve.

In some embodiments, a conventional socket, ratchet, wrench and/or combinations thereof are needed to assemble or disassemble fluid valves and fittings such as those used with toilets. These tools often must function well in confined spaces that are typically found in toilets, such as near tank-to-bowl gasket assemblies, where there is a need to provide adequate clearance to prevent impingement and/or damage to gasket and valve components.

In some embodiments, the kit includes one or more gaskets and one or more tools. In some embodiments, the one or more tools include a flush valve wrench (also referred to as a box-end wrench) and/or a fill valve wrench (also referred to as a handle/hex socket). The name of each respective wrench does not convey any limitation to their function or use with other systems according to some embodiments. For example, in some embodiments a fill valve wrench and/or a flush valve wrench may be used to rotate a toilet handle fastener. In some embodiments, a fill valve wrench and/or a flush valve wrench may be used to rotate a fastener not associated with a toilet.

In some embodiments, at least one side of the flush valve tool is configured to engage the flush valve fastener. In some embodiments, one side of the flush valve tool is configured to engage a flush valve fastener securing the flush valve to the tank. In some embodiments, at least one side of the flush valve tool is configured to engage a flush valve nut while at least a portion of the flush valve fastener is beneath at least one wall of the flush valve gasket. In some embodiments, all inner surfaces of a flush nut tool socket are configured to extend below an upper surface of a flush valve nut when the upper surface of the flush valve nut is below the upper surface of a flush valve gasket. In some embodiments, the flush valve tool allows for the rotational contact on all sides of a flush nut that is below the tank-to-bowl interface surface of a Kohler® gasket. In some embodiments, one or more portions of the flush valve tool is configured to engage with the fill valve tool.

In some embodiments, at least one side of the fill valve tool is configured to engage a fill valve fastener. In some embodiments, at least one side of the fill valve tool is configured to engage a handle fastener. In some embodiments, at least one side of the fill valve tool is configured to engage a toilet seat fastener. In some embodiments, engaging a fastener includes the ability to rotate a fastener. In some embodiments, the ability to rotate a fastener includes the ability to rotate the fastener while the fastener is connected to a stem (e.g., a threaded stem of a pipe or bolt). In some embodiments, the ability to rotate a fastener includes rotating the fastener while the stem projects through an aperture of the fill valve tool. In some embodiments, at least one side of the fill valve tool is configured to engage a bolt. In some embodiments, at least one side of the fill valve tool is configured to engage a nut. In some embodiments, at least one side of the fill valve tool is configured to engage a wing nut. In some embodiments, at least one side of the fill valve tool is configured to engage a socket wrench. In some embodiments, at least one side and/or apertures of the fill valve tool is configured to engage a screwdriver. In some embodiments, one or more portions of the fill valve tool is configured to engage with the flush valve tool.

In some embodiments, the fill valve tool and the flush valve tool can be used together to create a third tool to increase leverage on the flush valve tool. In some embodiments, the flush valve tool handle is configured to engage one or more slots in the fill valve tool. In some embodiments, the handle of the flush valve tool is configured to be at least partially inserted into the fill valve tool.

In some embodiments, the wing slots of at least one wing nut socket of the fill valve tool is configured to fit the wings of a wing nut and/or the handle of the flush valve tool. In some embodiments, fitting the flush valve handle into the wing slots effectively extends the length of the flush valve handle. In some embodiments, extending the length of the flush valve handle increase rotational leverage and/or torque. In some embodiments, using the fill valve tool to increase the length of a flush valve handle allows for a shorter flush valve handle and/or multiple flush valve handle protrusions distributed around the flush valve tool. In some embodiments, the fill valve tool and the flush valve tool can be used together to create a third tool to increase leverage on the fill valve tool. In some embodiments, the fill valve handle comprises at least one slot configured to engage with the flush valve handle. In some embodiments, the at least one fill valve slot can engage with multiple sides of the flush valve handle. In some embodiments, the flush valve handle is configured to increase rotational leverage and/or torque on the fill valve handle while the fill valve tool is connected to a fastener.

In some embodiments, the fill valve handle comprises a conventional socket wrench connection (e.g., a recess and/or aperture configured to fit an ⅛", ¼", ½", etc. square and/or hexagonal socket wrench protrusion). In some embodiments, the fill valve handle comprises a conventional socket fitting (e.g., a protrusion on the handle that fits into a conventional socket of a conventional socket wrench). In some embodiments, the flush valve handle comprises a socket wrench protrusion configured to engage the fill valve tool socket wrench connection, where the flush valve tool can be used to increase torque on the fill valve handle. In some embodiments, the flush valve handle comprises a socket recess and/or aperture configured to engage the fill valve tool socket wrench protrusion, where the flush valve tool can be used to increase torque on the fill valve handle.

In some embodiments, a kit including a fill valve tool and a flush valve tool constitutes a combination of parts that allows a user to assemble the novel product described herein. In some embodiments, a kit including a fill valve tool and a flush valve tool results in a synergistic combination where either tool can be used to increase rotational torque on the other. In some embodiments, a kit including a fill valve tool and a flush valve tool forms a functional unity through a purpose-directed application of being able to facilitate the tightening of multiple different fasteners during a fill and/or flush valve assembly.

Some embodiments are directed to a method of assembly of a toilet valve kit. In some embodiments, a method of assembly includes one or more of the following step: (1) providing one or more toilet components, the toilet components including one or more of at least one fill valve tool, at least one flush valve tool, at least one flush valve gasket, at least one flush valve assembly, at least one fill valve assembly, and/or at least one flush handle assembly; (2) providing at least one water container; (3) placing the toilet components in the water container. In some embodiments, the water container is a packaging configured to secure all components together as a single kit.

In some embodiments, the packaging (i.e., water container) is configured to be placed underneath a hole in the tank and/or configured to collect water flowing from the hole. In some embodiments, the water container includes a bag. In some embodiments, the water container includes a bucket. In some embodiments, the water retainer is a package comprising one or more recesses. In some embodiments, at least one recess of the one or more recesses is configured in the shape of at least one of the toilet components. In some embodiments, at least one recess of the one or more recesses is configured to prevent movement of more than one inch of a toilet component in any direction. In some embodiments, one or more recesses on one side of the package forms one or more corresponding protrusions on the other side of the package.

In some embodiments, at least a portion of the packaging is configured to prevent rotation of the packaging while the recess is being filled with liquid. In some embodiments, at least a portion of the packaging (water container) includes at least 3 points and/or a flat surface configured to prevent rotation (i.e., stabilize) the packaging during a liquid filling operation when the packaging is laid on a surface (e.g., a flat surface, an angled surface, and/or an irregular surface). In some embodiments, the packaging comprises at least one handle portion configured to allow a user to stabilize the water container underneath a tank while liquid is draining into the one or more recesses. In some embodiments, at least a portion of the packaging is configured to pass over and/or lay on at least a portion of the base of a toilet bowl while the water container stabilized on a surface. In some embodiments, at least a portion of the packaging is configured to conform to at least a portion of the base of a toilet bowl. In some embodiments, the toilet bowl confirmation portion of the packaging is configured to allow the recess to be positioned directly under a tank fill valve hole. In some embodiments, a curved portion of the recess is configured to prevent splashing. In some embodiments, the curved portion of the recess is configured to change the direction of falling water without water splashing out of the container. In some embodiments, at least one recess is designed to hold an amount of water retained in a tank after a flush has occurred. In some embodiments, the water container packaging that includes at least one recess is designed to hold between 0.1 and 5 gallons of liquid. In some embodiments, the water container packaging that includes at least one recess is designed to hold between 0.1 and 1 gallons of liquid. In some embodiments, the range of liquid volume the water container holds is greater than or equal to an amount present in the tank after a full and/or partial flush of the toilet. In some embodiments, the range of liquid volume the water container holds is greater than or equal to an amount below a flapper of a fill valve assembled to the tank after a full and/or partial flush of the toilet. In some embodiments, a kit including toilet components and a water container where the packaging also serves as the water container constitutes a combination of parts that allows a user to assemble the novel product described herein. In some embodiments, a kit that includes packaging that also serves as a water container allows for the tank to be disassembled from the bowl without water spilling to an area around the bowl which mitigates a damage and/or safety hazard. In some embodiments, a kit that includes packaging that also serves as a water container facilitates tank reassembly by another portion of the packaging storing and/or organizing one or more kit components during the installation steps.

In some embodiments, a kit including toilet components and a water container where the packaging also serves as the water container results in a synergistic combination where less items are needed to accomplish the same and/or a similar task as compared to the prior art (i.e. no need to buy and/or carry a water container). In some embodiments, a kit including toilet components and a water container where the packaging also serves as the water container forms a functional unity through a purpose-directed application of being able to facilitate removing and replacing toilet components while containing the spread of water flowing from a hole in the tank. In some embodiments, the process and/or method of combining one or more toilet components described herein with a water container that serves as packaging constitutes a product in the form of a kit that is formed by said process.

DESCRIPTION OF THE DRAWINGS

FIG. 7A shows a top view of a short gasket according to some embodiments.

FIG. 7B shows a side view of FIG. 7A as well as sectional view 7b-7b according to some embodiments.

FIG. 8A shows a top view of a tall gasket 800 according to some embodiments.

FIG. 8B shows a side view of FIG. 8A according as well as sectional view 8b-8b according to some embodiments.

FIG. 9A illustrates a top view of synergistic gasket according to some embodiments.

FIG. 9B shows a side view of FIG. 9A according as well as sectional view 9b-9b according to some embodiments.

FIG. 13 is a top perspective view of a fill valve tool in accordance with some embodiments.

FIG. 14 is a bottom perspective view of fill valve tool in accordance with some embodiments.

FIG. 19 shows packaging bottom half 1820 used as a water collection device in two different configurations according to some embodiments.

DETAILED DESCRIPTION

In some embodiments, any of the gaskets described herein can provide an effective seal by being compressed against a surface by one or more fluidic components (e.g., such as a flush valve). In some embodiments, at least a portion of the gasket can spread or deform across at least one interface coupled to the gasket (e.g., a surface of at least one component or assembly such as a base of a toilet tank). In some embodiments, any of the gasket structures described herein can be compressed within a fluid coupling to form or maintain a seal between any substantially smooth and/or uneven interface. Some embodiments of the gasket can include one or more grooves, channels, extensions, flanges, washers, and/or rings that can assist and/or take part in the deformation and spreading of the gasket over a surface. In some embodiments, the flanges, washers, and/or rings are provided as separate toilet components within the kit.

Some embodiments can provide a consumer with a tank-to-bowl gasket kit for a conventional 2-piece toilet flush valve repair/replacement project. Some embodiments provide a kit with two gasket types for possible use with three common types of tank-to-bowl gasket conditions. In some embodiments, a third type of gasket assembly can be achieved by coupling the two gaskets provided together as an assembly step and/or as part of an installation method. This assembly step reduces waste by providing three gasket types using only two gaskets. In some embodiments, this can provide a supplier and/or manufacturer with an option of using a smaller packaging for the kit that uses less raw materials, and potentially uses less shelf space at a retail store.

Figure 1:
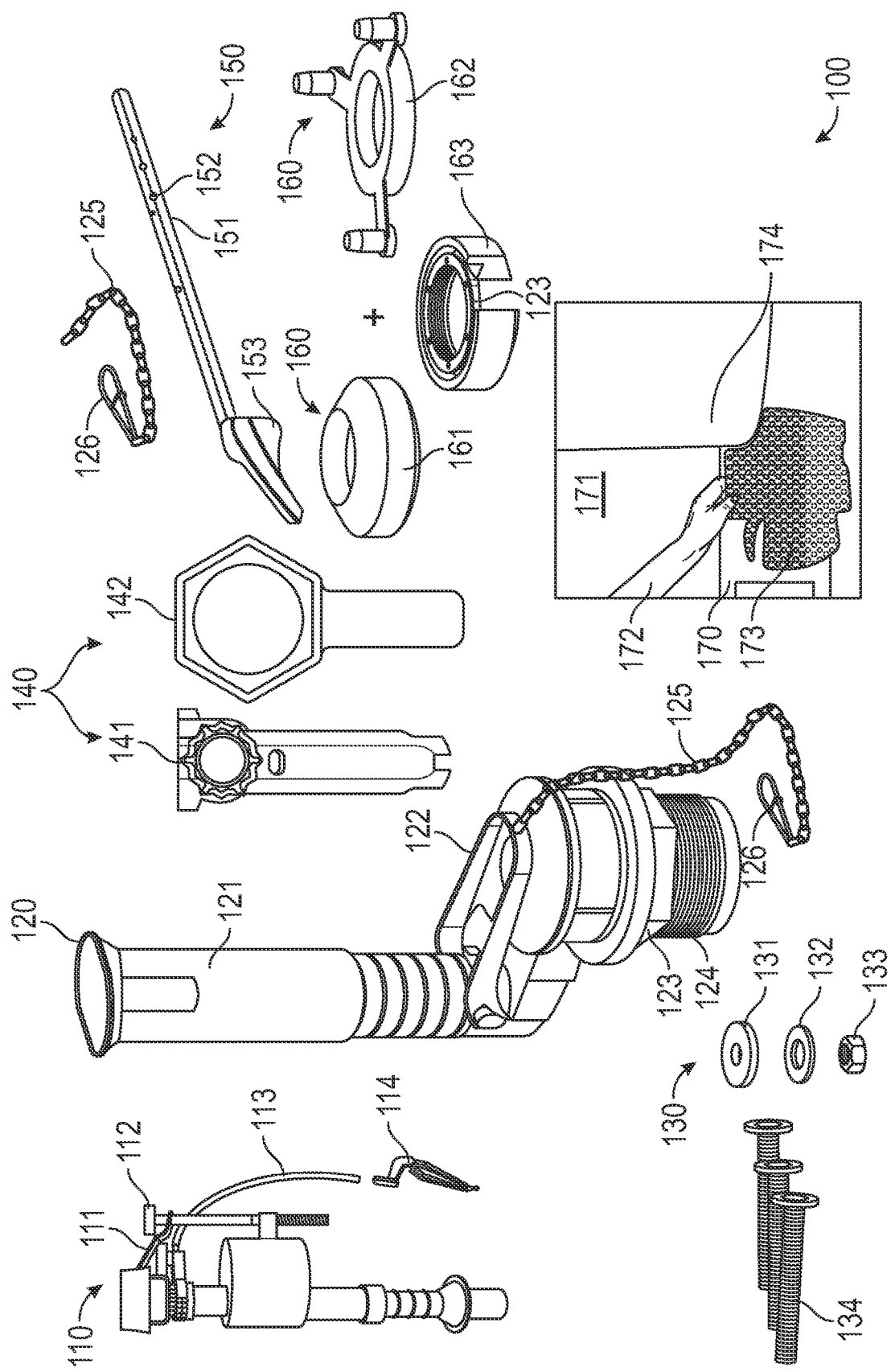
FIG. 1 shows a perspective view of one or more toilet kit components according to some embodiments.

FIG. 1 shows a perspective view of one or more toilet kit components according to some embodiments. In some embodiments, the toilet kit 100 includes a fill valve 110. In some embodiments, the fill valve 110 includes one or more of a bowl water level dial 111, a tank water level adjustment screw 112, a refill tube 113, and/or a refill clip 114. The fill valve 110 is provided for illustrative purposes only and any fill valve can be used in the kit according to some embodiments.

In some embodiments, the toilet kit 100 includes a flush valve 120. In some embodiments, the flush valve 120 includes one or more of an overflow tube 121, a flapper 122, a flush valve fastener 123, a flush valve stem 124, and a flapper chain 125. In some embodiments, the flush valve fastener is a threaded flush valve nut. In some embodiments, a flush valve stem 124 is a threaded flush valve stem and/or threaded pipe. The flush valve 120 is provided for illustrative purposes only and any flush valve can be used in the kit according to some embodiments.

In some embodiments, the toilet kit 100 includes hardware 130. In some embodiments, hardware 130 includes one or more bolts 134, bolt gaskets 131, bolt washers 132, and bolt nuts 133. In some embodiments, the kit is provided with any hardware needed to install and or manipulate one or more components of the kit and/or a toilet.

In some embodiments, the toilet kit 100 includes one or more tools 140. In some embodiments, tools 140 include one or more of a fill valve tool 141 and/or a flush valve tool 142. Fill valve tool 141 and flush valve tool 142 are described later in greater detail according to some embodiments.

In some embodiments, the toilet kit 100 includes a handle assembly 150. In some embodiments, a handle assembly 150 includes one or more of a lever arm 151, chain holes 152 to connect the chain clip 126 of chain 125, and a flush handle 153.

In some embodiments, the toilet kit 100 includes one or more tank-to-bowl (i.e., flush valve) gaskets 160. In some embodiments, one or more gaskets 160 include at least one of a standard gasket 161, a Kohler® gasket 162, and a Gerber® gasket 163. In some embodiments, flush valve nut 123 is shown inside Gerber® gasket 163 for installation reference and/or part identification purposes.

In some embodiments, the toilet kit 100 includes one or more water containers 170. In some embodiments, water containers 170 also serve as at least part of the kit packaging and have a method of use 171 associated therewith, as outlined in black in FIG. 1. In some embodiments, the method of use 171 is illustrated on and/or in the kit and shows a user 172 holding the packaging 170 underneath a tank 174 such that water 173 draining from the tank 174 is collected and contained within the water container 170. In some embodiments, the method of use is illustrated on and/or in the kit and shows a user placing the container on the floor next to the toilet. In some embodiments, the method of use is illustrated with at least a portion of the packaging overlapping a portion or the toilet base.

Figure 2:
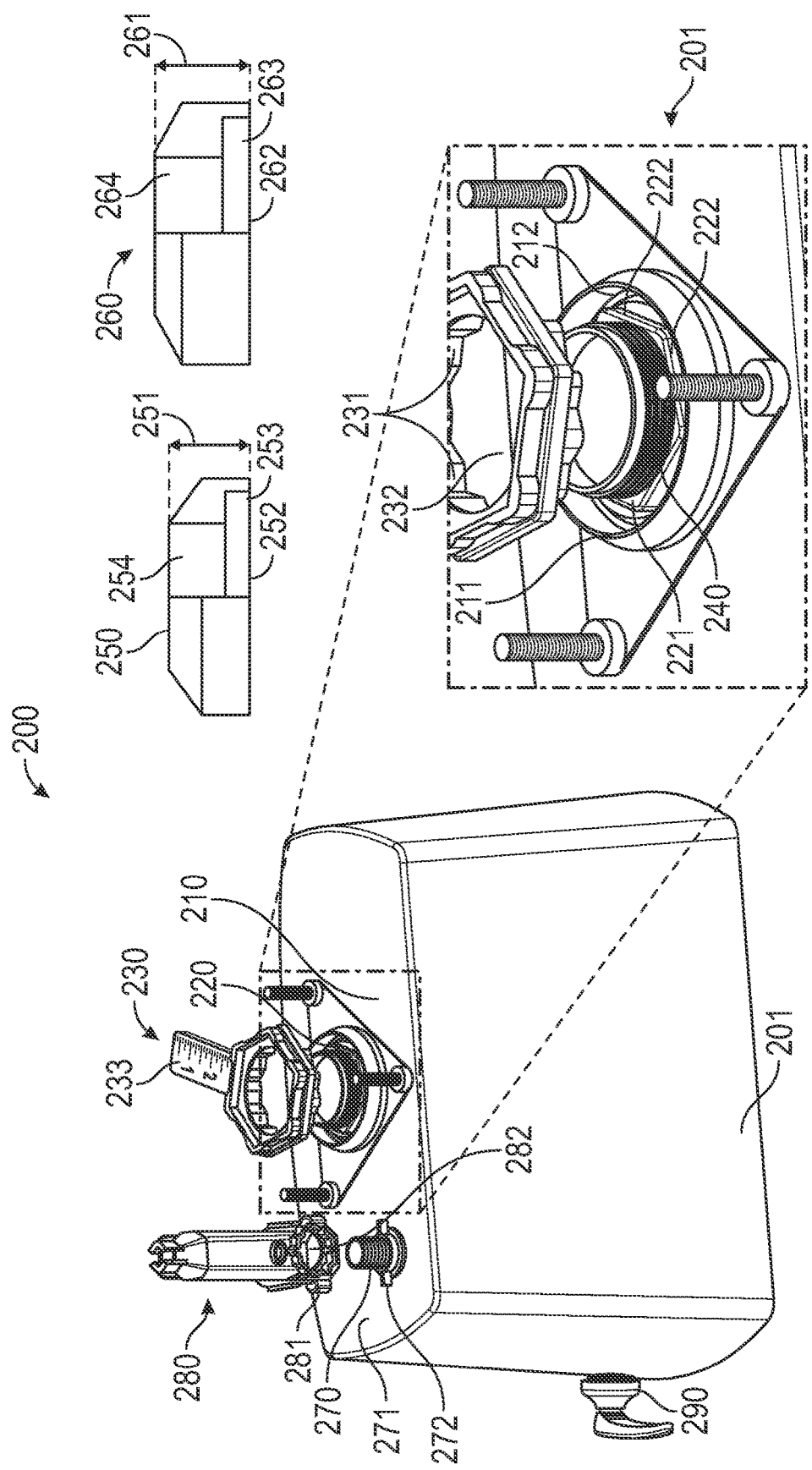
FIG. 2 illustrates an installation using kit components in accordance with some embodiments.

FIG. 2 illustrates an installation 200 using kit components in accordance with some embodiments. In some embodiments, a triangle gasket 210 has been placed on a toilet tank 201 and a flush valve fastener 220 has been threaded onto a flush valve steam 240 such that the flush valve fastener 220 rest and/or is pressed against the triangle gasket 210. In some embodiments, a triangle gasket 210 is a Kohler® gasket 210.

In some embodiments, a flush valve tool 230 has inner walls 231 which extend away from an aperture 232 in the center of the flush valve tool 230. In some embodiments, the aperture 232 defines a region where the walls extending from each side of the aperture define tools for different sized nuts. In some embodiments, the inner walls 231 are configured to engage one or more points on the flush valve fastener 220 outer walls 222, such that a rotation of the flush valve tool 230 rotates the flush valve fastener 220. In some embodiments, aperture 232 is configured to allow the flush valve stem 230 to pass therethrough during a rotation of the flush valve fastener 220.

In some embodiments, the flush fastener 220 upper surface 221 is below the triangle gasket 210 upper surface 211. In some embodiments, the inner walls 231 are configured to engage one or more points on a flush valve fastener 220 outer wall 222 when a flush valve fastener 220 upper surface 223 is below the triangle gasket 210 upper surface 211. In some embodiments, the flush valve tool 230 inner walls 231 are configured to engage one or more points on a flush valve fastener 220 outer wall 222 when the handle 233 is extending substantially parallel to the plane of the aperture 212 formed by the upper surface 211. In some embodiments, the flush valve tool 230 inner walls 231 are configured to engage one or more points on a flush valve fastener 220 outer wall 222 when the tool aperture 232 is above the aperture 212 formed by the triangle gasket upper surface 211. A reference to the outer wall 222 is a reference to one or more and/or all walls that define the parameter of the fastener according to some embodiments.

FIG. 2 further shows a fill valve tool 280 being used to rotate a fill valve fastener 271 along a fill valve stem 270 to lock a fill valve in place and/or seal a fill valve tank hole according to some embodiments. In some embodiments, the fill valve tool 280 has wing slots 281 that are configured to engage one or more wings 272 of fill valve fastener 271 to enable rotation of fill valve fastener 271. In some embodiments, fill valve tool 280 comprises one or more holes, hollow portions, and/or apertures 282 that allow the flush valve stem 270 to pass therethrough during rotation of fill valve fastener 272.

FIG. 2 also includes a side perspective of short gasket 250 and tall gasket 260 according to some embodiments. In some embodiments, a short gasket 250 and a tall gasket 260 are a conventional standard gasket 250 and a conventional Gerber® gasket 260, respectively. In some embodiments, a short gasket 250 has a height 251, 261 and/or width (diameter) 252, 262 that is less than tall gasket 260. In some embodiments, both gaskets 250, 260 include a fastener recess (aperture) 253, 263 configured to surround at least a portion of the flush valve fastener 220. In some embodiments, both gaskets 250, 260 include a stem aperture 254, 264 configured to surround at least a portion of the flush valve stem 240 and/or allow water flowing from the fill valve stem 240 to pass therethrough.

Further shown in FIG. 2 is one or more components of handle assembly 290 attached to tank 201. The details of one or more toilet kit components shown in FIG. 2 are described in further detail through this disclosure.

Figure 3:
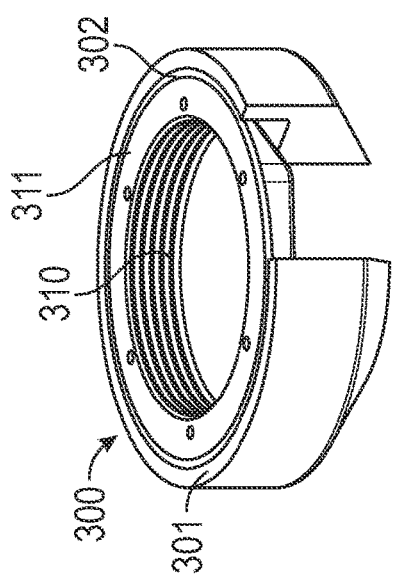
FIG. 3 shows a perspective view of a conventional standard type tank-to-bowl gasket (i.e., short gasket) according to some embodiments.

FIG. 3 shows a perspective view of a conventional standard type tank-to-bowl gasket 300 (i.e., short gasket) according to some embodiments. As illustrated, in some embodiments, the short gasket 300 is configured to fit over a flush valve nut 310 such that the flush valve nut 310 lower surface 311 (i.e., tank-side-surface) is below the short gasket 300 lower surface 301.

Figure 4:
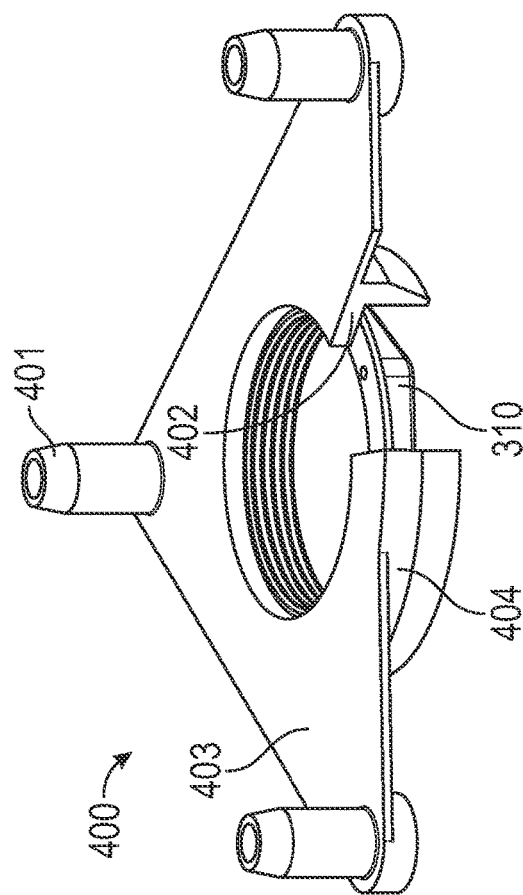
FIG. 4 shows a perspective view of a Kohler® style tank-to-bowl gasket (i.e., triangle gasket) according to some embodiments.

FIG. 4 shows a perspective view of a Kohler® style tank-to-bowl gasket 400 (i.e., triangle gasket) according to some embodiments. In some embodiments, the flush nut 410 is separated from a tank wall by the triangle gasket's 400 lower wall 402. In some embodiments, the height of the lower wall 402 (i.e., the distance of separation from the tank wall) is substantially 0.2 inches. In some embodiments, the height of the lower wall 402 is substantially the difference between the height of a short gasket and the height of a tall gasket. In some embodiments, the height of the lower wall 402 plus the height of the short gasket 300 is substantially equal to the height of the tall gasket 500.

Figure 5:
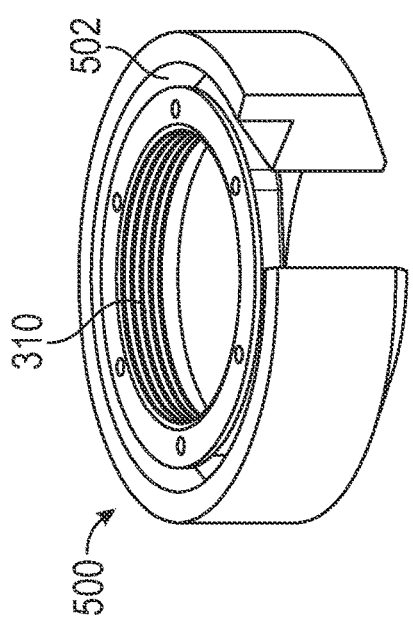
FIG. 5 shows a conventional Gerber® gasket (i.e., tall gasket) according to some embodiments.

FIG. 5 shows a conventional Gerber® gasket 500 (i.e., tall gasket) according to some embodiments. In some embodiments, the difference in width (diameter) between a short gasket 300 and a tall gasket 500 is illustrated by the width of a short gasket 300 gap 302 and a tall gasket 500 gap 502 when each respective gasket surrounds the flush valve fastener 310. In some embodiments, FIGS. 3 and 5 illustrate that the gap 502 is wider than the gap 302.

Figure 6:
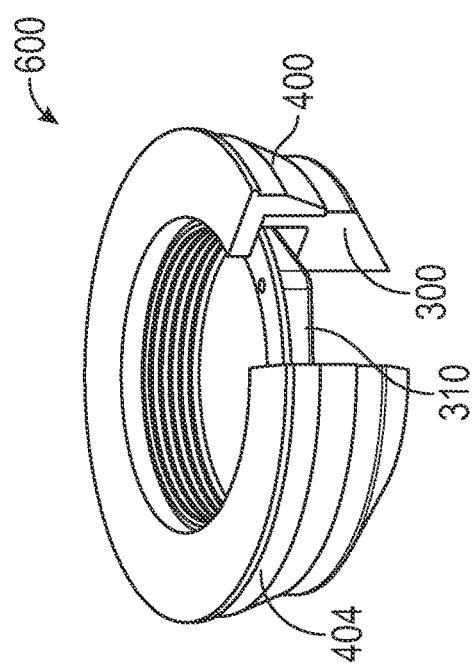
FIG. 6 shows a synergistic gasket which is formed by positioning the short gasket 300 into the triangle gasket according to some embodiments.

FIG. 6 shows a synergistic gasket 600 which is formed by positioning the short gasket 300 into the triangle gasket such that the lower surface 301 rest on the lower wall 402 according to some embodiments. In some embodiments, the synergistic gasket 600 is configured to house the flush nut fastener 310 between the short gasket 300 and the triangle gasket 400 as illustrated. In some embodiments, at least a portion of grommet extensions 403 are removed (e.g., trimmed using a blade or scissors) from triangle gasket 400 wall 404. In some embodiments, removing at least a portion of grommet extensions 403 result in synergistic gasket 600 having a width greater than or equal to tall gasket 500. In some embodiments, removing at least a portion of grommet extensions 403 result in synergistic gasket 600 having a width substantially equal to tall gasket 500. In some embodiments, removing at least a portion of grommet extensions 403 (and grommets 401 by consequence) results in synergistic gasket 600 being able to seal a tank-to-bowl interface configured to be sealed by the tall gasket.

FIG. 7A shows a top view of a short gasket 700 according to some embodiments. In some embodiments, FIG. 7B shows a side view of FIG. 7A as well as sectional view 7b-7b. In some embodiments, short gasket 700 has a first height 701 and a first width 702.

FIG. 8A shows a top view of a tall gasket 800 according to some embodiments. In some embodiments, FIG. 8B shows a side view of FIG. 8A according as well as sectional view 8b-8b. In some embodiments, tall gasket 800 has a third height 801 and a third width 802. In some embodiments, third height 801 is greater than first height 701. In some embodiments, third width 802 is greater than first width 702.

FIG. 9A illustrates a top view of a synergistic gasket 900 according to some embodiments. In some embodiments, FIG. 9B shows a side view of FIG. 9A according as well as sectional view 9b-9b. In some embodiments, synergistic gasket 900 is formed by positioning short gasket 700 within triangle gasket 1000 as shown. In some embodiments, the resulting synergistic structure gasket 900 has a height 901 substantially equal to height 801. In some embodiments, the resulting synergistic gasket 900 has a synergistic outer wall portion 903 with a width 902 substantially equal to width 802. In some embodiments, a removed width 904, created by triangle portion (e.g., rubber grommet extensions 1001) removal, is substantially equal to width 802 and/or 902 and/or 903 after at least a portion of triangle gasket 1000 has been removed.

Figure 10B:
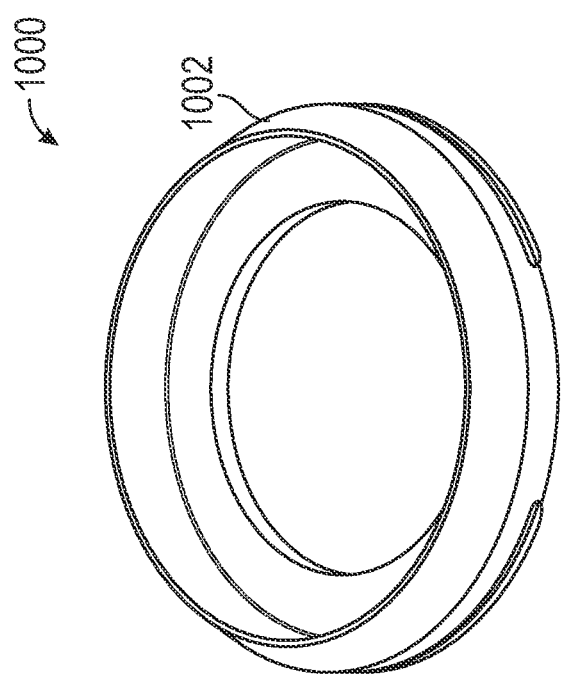
FIG. 10B shows triangle gasket with grommet extensions removed according to some embodiments.
Figure 10A:
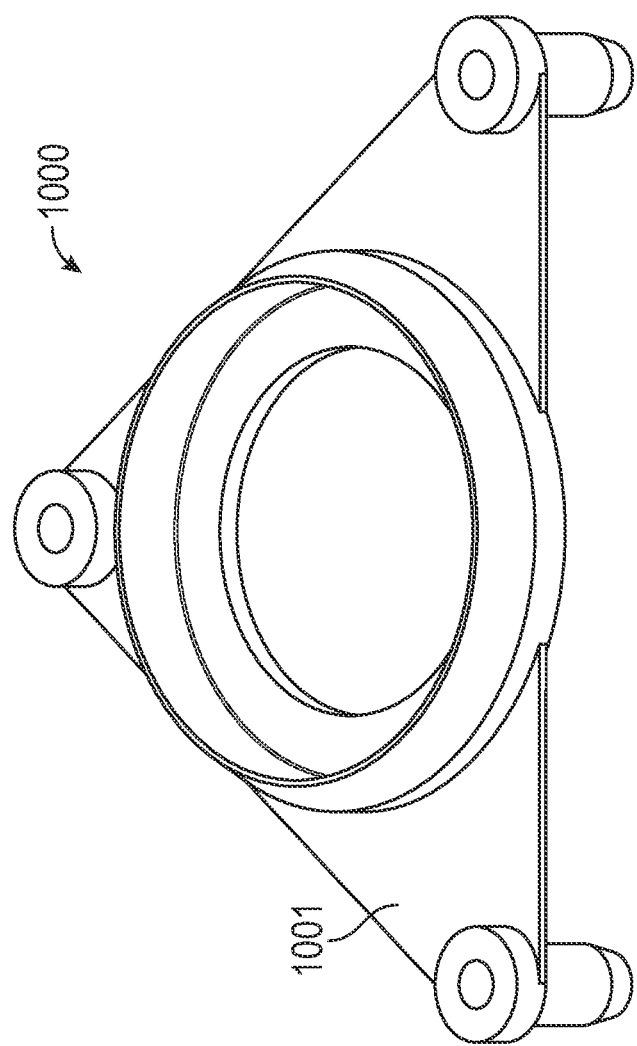
FIG. 10A depicts a triangle gasket without grommet extensions removed according to some embodiments.

FIG. 10A depicts a triangle gasket 1000 without grommet extensions 1001 removed. In some embodiments, FIG. 10B shows triangle gasket 1002 with grommet extensions 1001 removed.

Figure 12:
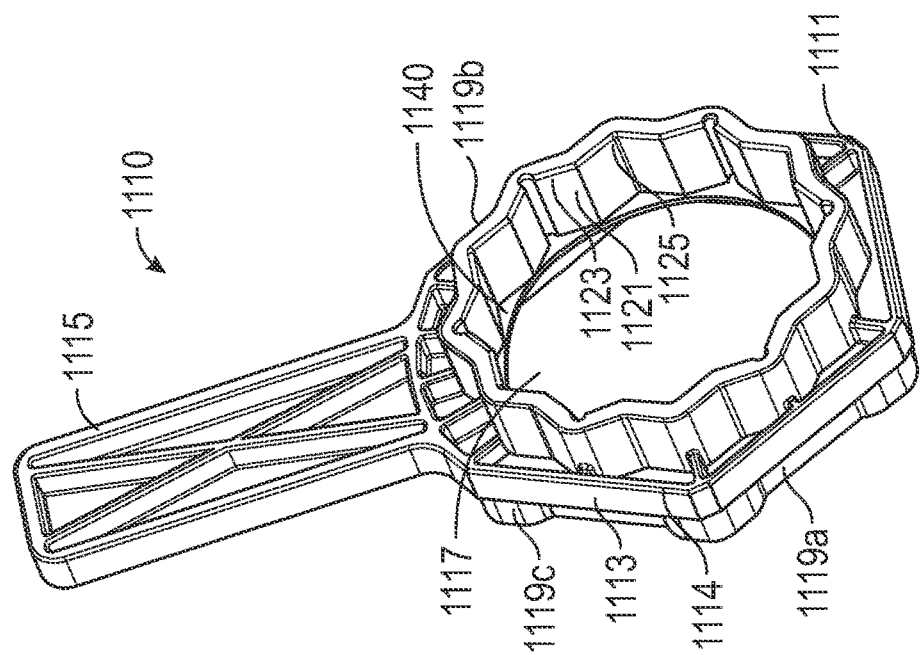
FIG. 12 is a bottom perspective view of the flush valve tool in accordance with some embodiments.
Figure 11:
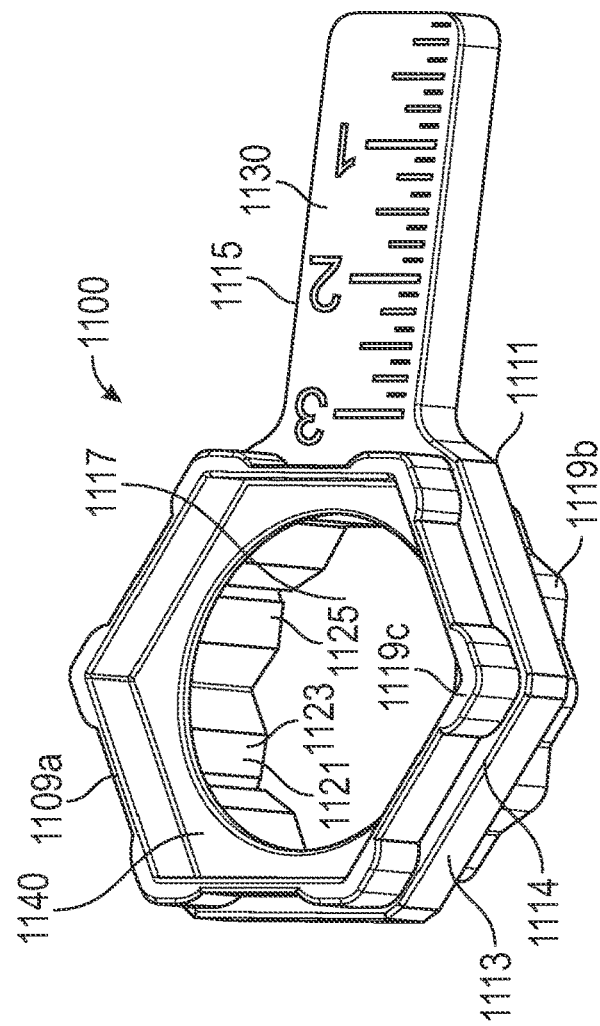
FIG. 11 is a top perspective view of a flush valve tool (also referred to as a box-end wrench) in accordance with some embodiments.

FIG. 11 is a top perspective view of a flush valve tool 1100 (also referred to as a box-end wrench) in accordance with some embodiments, and FIG. 12 is a bottom perspective view of the flush valve tool 1100 in accordance with some embodiments. In some embodiments, the flush valve tool 1100 can comprise a body 1111 comprising a head 1113 (e.g., a hex head) and a handle 1115 coupled to or integrated with and/or extending from the head 1113. In some embodiments, the head 1113 of the box-end wrench 1100 can comprise a frame 1114 including at least one fitting comprising bolt or nut coupling interfaces surrounding an aperture 1117.

In some embodiments, the bolt or nut coupling interfaces can comprise hex bolt or nut coupling interfaces. In some embodiments, the multi-sided head 1113 can comprise coupling interfaces structured to couple with different and/or universal sizes of a multi-sided (e.g., hex-head) bolts and/or nuts. In some embodiments, a first coupling interface 1119a can extend from one side of the frame 1114, and a second coupling interface 1119b can extend from an opposite side of the frame 1114.

In some embodiments, the multi-sided head 1113 can comprise extended interfaces. In some embodiments, the first coupling interface 1119a can comprise a wall extending a distance from the frame 1114, and the second coupling interface 1119b can comprise a wall extending a distance from the frame 1114. In some embodiments, the distances of each wall can be shorter or longer than shown in the non-limiting embodiment of FIGS. 11 and 12. In some embodiments, the distance of the walls extending from the frame 1114 can enable the coupling interfaces 1119a, 1119b to fit into confined spaces or geometries such as fitting into, onto and/or around a gasket of a flush valve.

In some embodiments, the inner surfaces of the walls can comprise a plurality of points formed by opposing surfaces of the wall extending at least a partial distance around the frame 1114. For example, some embodiments include a six-point wall comprising a hexagon that can be used to couple with a complementary hexagonal bolt or nut. Further, in some embodiments, the second coupling interface 1119b can comprise a plurality of points formed by opposing surfaces of the wall extending at least a partial distance around the frame 1114 on an opposite side to the first coupling interface 1119a. For example, some embodiments include a total of twelve points 1121 with each point 1121 comprising coupled opposing wall faces 1123, 1125.

In some embodiments, portions of the walls can include reinforced regions. For example, as shown in FIGS. 11 and 12, some embodiments include reinforced regions 1119c at least partially surrounding the hexagonal points.

In some embodiments, the aperture 1117 can be formed through an inner extension 1140 positioned between the walls of the coupling interfaces 1119a, 1119b, and extending at least partially into the aperture 1117. In some embodiments, the inner extension 1140 can extend circumferentially around the aperture 1117.

In some embodiments, the handle 1115 can comprise a ruler 1130 on one side including one or more measurement markings on one side of the ruler 1130. In some embodiments, the markings can be marked by painting or printing. In other embodiments, the markings can be prepared by any other conventional marking process, including, but not limited to embossing, engraving, molding, etching, and/or laser-marking, or a combination thereof.

Some embodiments include one or more sockets which can be used to loosen or tighten nuts or wing nuts. In some embodiments, one or more sockets can be used to loosen or tighten one or more different types of lock nuts on a fill valve stem. For example, FIG. 13 is a top perspective view of a fill valve tool 1300 (also referred to as a handle/hex socket) in accordance with some embodiments. FIG. 14 is a bottom perspective view of fill valve tool 1300 in accordance with some embodiments. In some embodiments, the fill valve tool 1300 can provide a hand grip that enables loosening and/or tightening fasteners (e.g., conventional hex nuts and/or wing nuts), such as those that are used for attaching a toilet tank to a toilet bowl. In some embodiments the hand grip can enable loosening and/or tightening of various fastener types commonly used on a fill valve stem.

Figure 15:
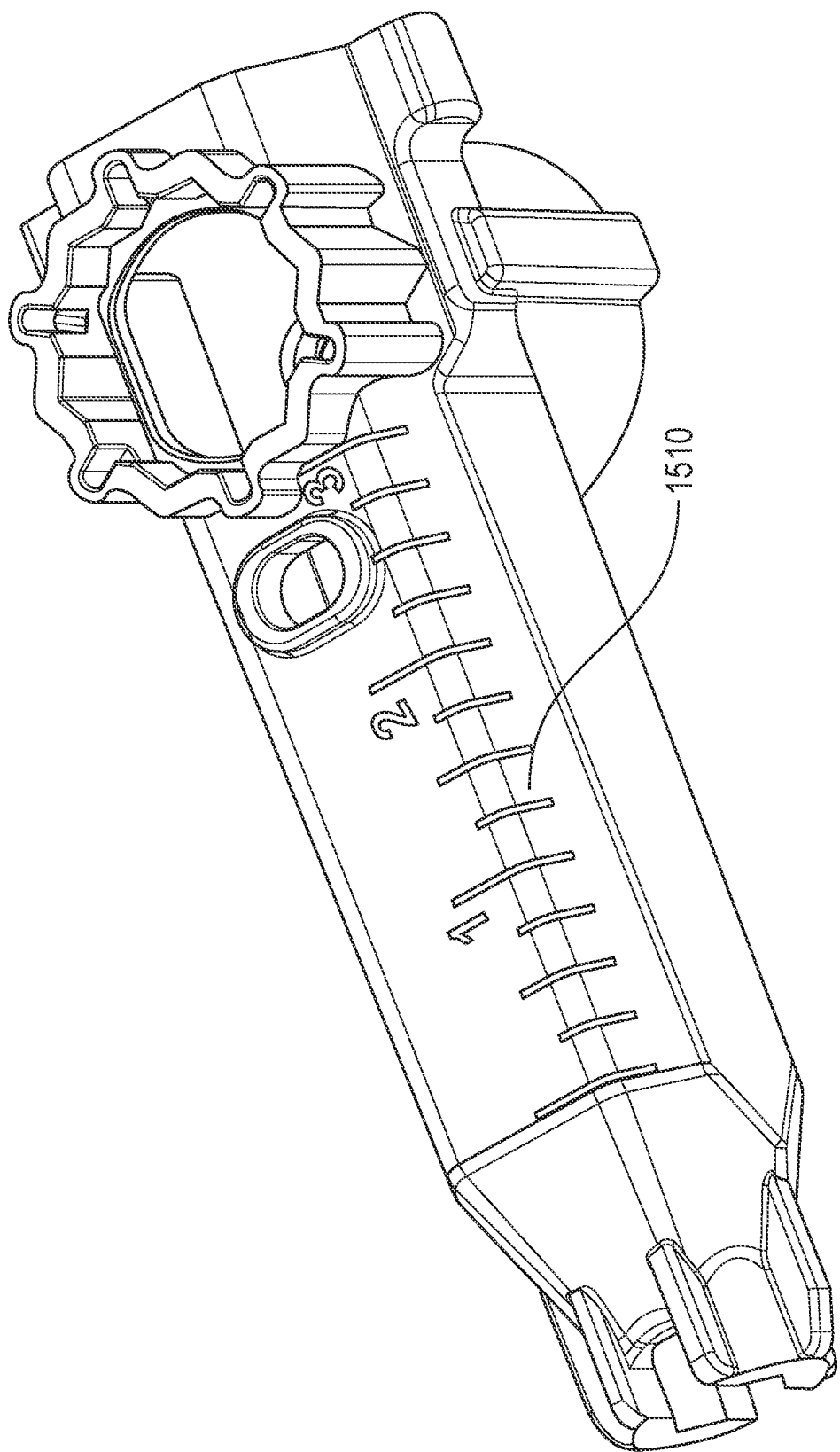
FIG. 15 is a top perspective view of a fill valve tool showing a ruler 1510 on handle 1305 in accordance with some embodiments.

Some embodiments of fill valve tool 1300 include a ruler that can be used for valve and water level setting measurements. For example, FIG. 15 is a top perspective view of a fill valve tool 1300 showing a ruler 1510 on handle 1305 in accordance with some embodiments. Some embodiments include a ruler on any location viewable by a user.

In some embodiments, the fill valve tool 1300 can include a plurality of sockets positioned at various locations on the fill valve tool 1300. For example, with reference to FIGS. 13 and 14, some embodiments include fill valve lock nut socket 1310 positioned extending from a side of a first end 1390 of a handle 1305 that is also configured to engage a wing nut. Some embodiments include fill valve lock nut socket 1350 extending from a first end 1390 of the handle 1305 that is also configured to engage a wing nut. Some embodiments include fill valve lock nut socket 1380 positioned extending from a side of a first end 1390 of a handle 1305 on an opposite side of the handle 1305 to the fill valve lock nut socket 1310 that is configured to engage a wing nut. Some further embodiments include a plurality of recess notches 1382 (i.e., slots, recesses) on the end of the fill valve tool 1300 and extending into the fill valve lock nut socket 1380. In some embodiments, the recess notches 1382 (also referred to as wing nut slots and or recesses) can enable fitting or coupling with fill valve fasteners that include wings 272 (see FIG. 2). Some embodiments include a plurality of recess notches 1352 extending into the socket 1350. In some embodiments, the recess notches 1352 can enable fitting or coupling with some fill valve lock nuts that include wings. In some embodiments, recess notches 1352 can enable fitting or coupling with one or more other tools as described herein.

In some embodiments, each of the sockets 1310, 1350, 1380 can comprise apertures in the handle 1305. Some other embodiments can include a nut socket 1390 extending from and through the second end 1307. In some embodiments, any of the sockets 1310, 1350, 1380, 1390 can be larger or smaller than illustrated to accommodate alternate sizes of nuts or bolts. Further, any of the sockets 1310, 1350, 1380, 1390 can comprise different numbers of points, wall lengths, or shapes than shown to accommodate or complement alternate universal or conventional sizes, types, or shapes of nuts, bolts, valves, etc.

In some embodiments, fill valve tool 1300 can include one or more features to enable a user to maintain or increase rotational torque during use. For example, in some embodiments, an aperture 1325 in the handle 1305 of the fill valve tool 1300 can accommodate a screw driver or other tool to generate more torque when twisting the handle of the fill valve tool 1300 when coupled to a nut, bolt, valve, etc. In some embodiments, the fill valve tool 1300 can include more than one aperture 1325 and/or an aperture 1325 positioned through the handle 1305 in a different location than shown.

The flush valve tool 1100 and the fill valve tool 1300 can be used independently of one another for the functions intended of each tool's features. In some embodiments, the flush valve tool 1100 and the fill valve tool 1300 can be used together.

Figure 16:
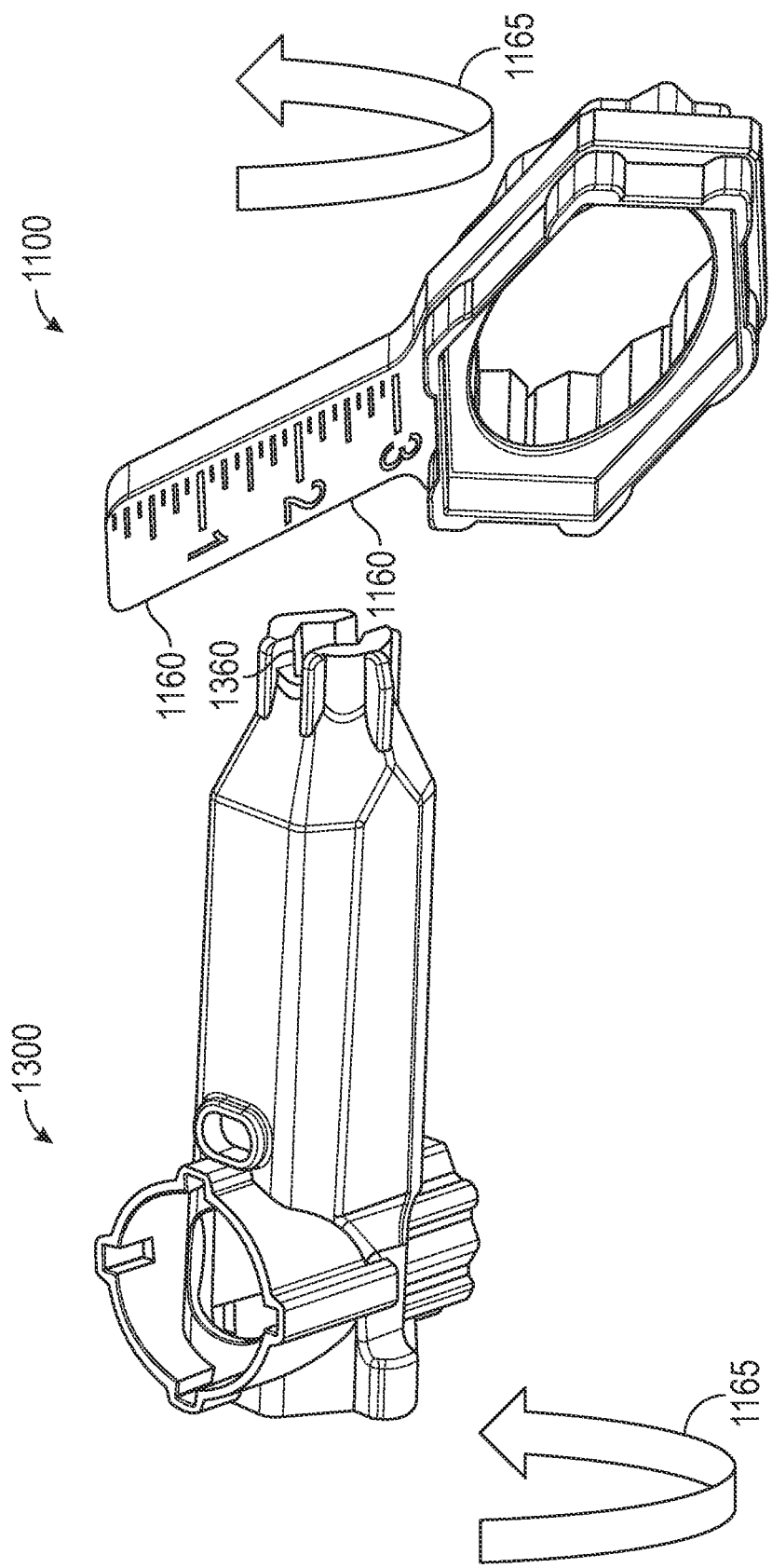
FIG. 16 illustrates a flush valve tool and the fill valve tool being used together according to some embodiments.

FIG. 16 illustrates flush valve tool 1100 and the fill valve tool 1300 being used together according to some embodiments. In some embodiments, a handle side portion 1160 is fitted into a fill valve tool slot 1360 so as to increase a rotational lever arm (i.e., torque) on fill valve tool 1300 when flush valve tool 1100 is rotated. In some embodiments, different portion of handle side portion 1160 and be used to decrease in increase torque as desired. For example, in some embodiment handle side portion 1160 can be inserted at the 1" mark on the handle 1305 and a flush valve tool rotation 1165 results in a fill valve tool rotation 1165 about the handle 1305 longitudinal axis. In some embodiments, handle side portion 1160 can be inserted at the 2" mark to decrease the rotation lever arm and/or allow the user to rotate 1165 the flush valve tool 1100 using two hands.

Figure 17:
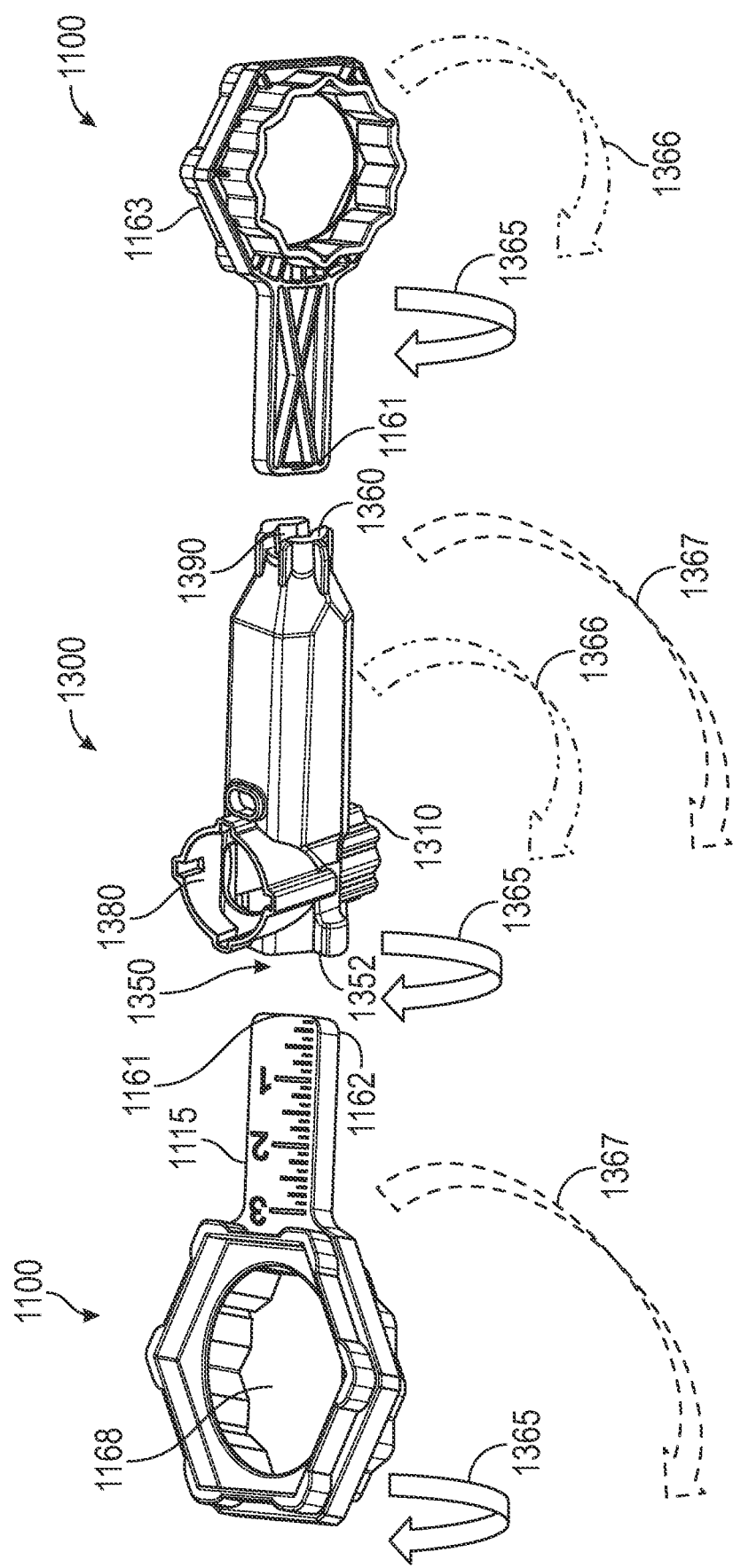
FIG. 17 shows various non-limiting rotational configurations for a flush valve tool and a fill valve tool.

FIG. 17 shows various non-limiting rotational configurations for flush valve tool 1100 and fill valve tool 1300. In some embodiments, a flush valve tool 1100 handle end 1161 can be inserted into fill valve tool 1300 slot 1360 effectively increasing the length of fill valve tool 1300 handle 1305 while simultaneously increasing torque as a user grips flush valve tool 1100 head 1163 to rotate 1365 fill valve tool 1300 about the longitudinal axis of the handle 1305. In addition, in some embodiments, positioning handle end 1161 inside slot 1360 effectively increase torque for rotation 1366 about the rotational axis for sockets 1310 and 1380.

In some embodiments, flush valve hand end 1161 can be inserted into fill valve socket 1350 to effective increase the handle length of handle 1115. In some embodiments, handle end 1161 corner 1162 engages with wing slots 1352 to facilitate a tighter fit and/or increased torque when rotating 1367 flush valve tool 1100 about the flush valve tool socket axis 1168. In some embodiments, handle end 1161 corner 1162 engages with wing slots 1352 to facilitate increased torque when rotating 1365 first end 1390. First end 1390 is a socket and/or socket wrench connection according to some embodiments.

Figure 18:
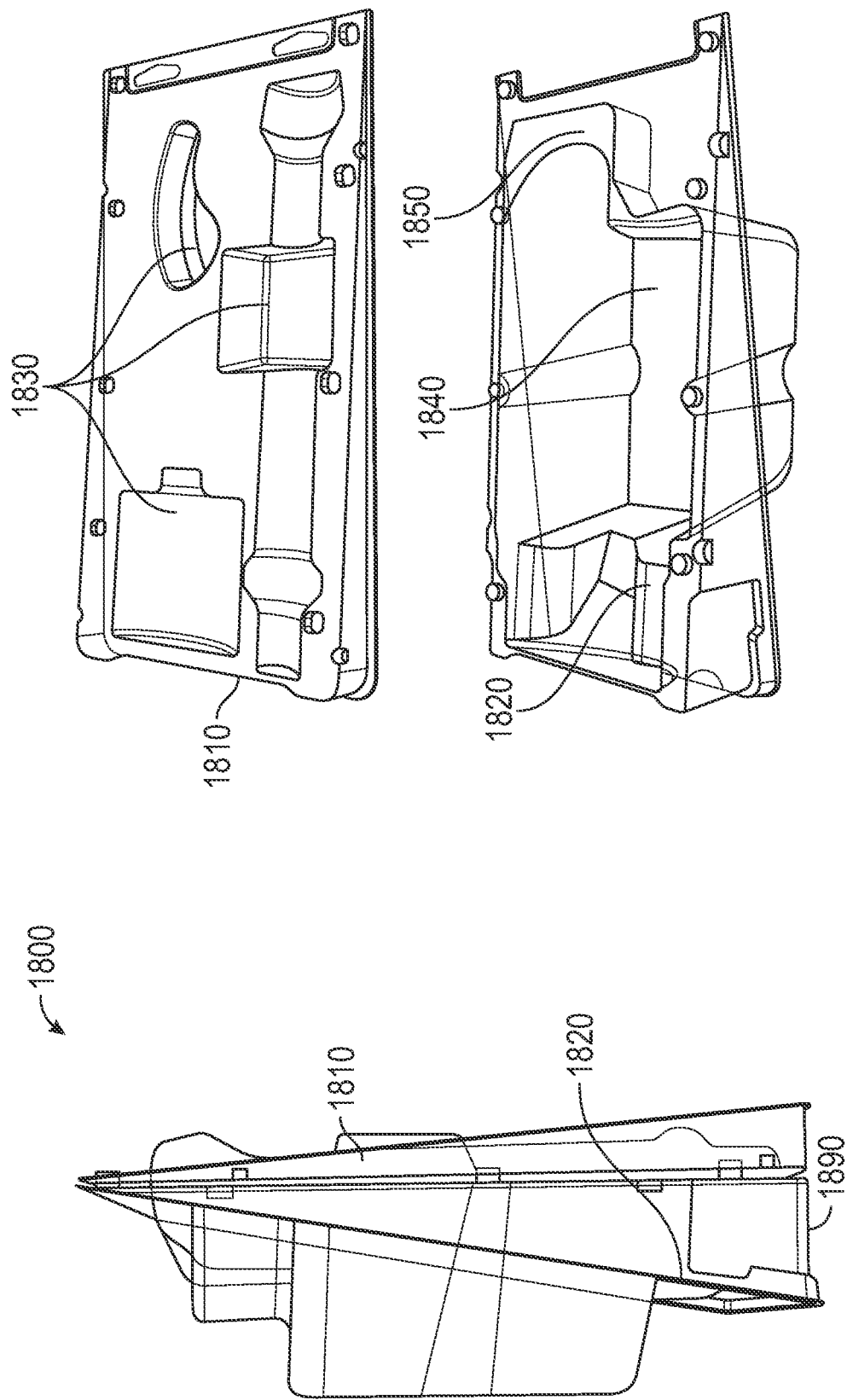
FIG. 18 shows a packaging that is separable into a top half and a bottom half according to some embodiments.

FIG. 18 shows a packaging 1800 that is separable into a top half 1810 and a bottom half 1820 according to some embodiments. In some embodiments, the top half 1810 and/or the bottom half 1820 can be used as a water container and/or packaging. In some embodiments, the top half 1810 and/or bottom half 1820 can have one or more protrusions and/or recesses 1830 that define the shape of one or more kit components. In some embodiments, top half 1810 and/or bottom half 1820 can have one or more protrusions and/or recesses 1840 that facilitate the collection of liquid. In some embodiments, top half 1810 and/or bottom half 1820 can have one or more protrusions and/or recesses with a curved surface 1850 that can direct water to a water collection recess 1840 while minimizing splashing of liquid out of the container 1820. In some embodiments, when the two halves are combined, the resulting structure creates a base 1890 that allows the package to stand stable vertically on a flat surface (i.e., perpendicular to the direction of gravity).

FIG. 19 shows packaging bottom half 1820 used as a water collection device in two different configurations according to some embodiments. In some embodiments, as shown in 19(*a*), the packaging 1820 has a flat bottom 1821 that rest on a surface (e.g., the floor) adjacent a toilet base 1860. In some embodiments, one or more curved or angled surfaces (not shown) directs water falling perpendicular to horizontal line 1870 into the water container. In some embodiments, water falling perpendicular to horizontal line 1870 falls onto flat surface 1821 and splashes upon impact. In some embodiments, the height of packaging wall 1822 is prevents the splashing water from exiting the container. In some embodiments, the height of packaging wall 1822 is prevents at least a portion of the splashing water from exiting the container. In some embodiments, the volume of water that can be held by container 1820 when the flat surface 1821 is laid on a horizontal surface 1821 (which is perpendicular with respect to the direction of gravity) is between 0.1 and 1 gallons. In some embodiments, the packaging is configured to hold from 0.1 to 5 gallons, as in the case of a kit that uses a 5 gallon bucket as packaging (not shown). In some embodiments, packaging 1820 comprises a toilet base 1860 conforming area 1826. In some embodiments, conforming area 1826 conforms to bowl 1860 such that the water container packaging 1820 is aligned beneath a fill valve aperture in a toilet tank (not shown). In some embodiments, conforming area 1826 conforms to bowl 1860 such that the water container packaging 1820 is aligned beneath a fill valve aperture such that falling water is directed to a curved surface for redirection and/or to prevent splashing.

As shown in 19(b), packaging 1820 is in a reverse state which illustrates other possible water collection configurations and/or packaging arrangements. In some embodiments, a surface or protrusion 1823 is laid on a raised surface and/or the toilet bowl base 1860 and a second surface and/or protrusion 1828 is laid on another surface (e.g., the floor) such that an angle θ 1824 is created between the horizontal surface 1870 and a packaging collection surface 1827. In some embodiments, this configuration directs liquid to a liquid retention portion 1825 while also minimizing splashing. While in this example packaging 1820 has both a flat configuration 19(a) and an angle configuration 19(b), the two configurations can be separated and/or combined according to some embodiments.

In some embodiments, the standard gasket body can comprise a circular gasket body with an inner support ring encircling a gasket aperture that can support and/or seal a surface of a fitting comprising an aperture, such the previously described valve or pipe fitting. In some embodiments, this inner support ring can help to center the gasket onto a surface, component or assembly (e.g., such as a flush valve). In some embodiments, the inner support ring can comprise an inner surface extending from an upper wall towards the aperture. In some embodiments, the inner surface can couple to an inner edge surface of the upper wall. In some embodiments, the inner edge surface and the inner surface of the inner support ring can be substantially perpendicular as shown. In some other embodiments, the inner edge surface and the inner surface of the inner support ring can be non-perpendicular, where either one or both of the inner edge surface and/or the inner surface can be sloped away or towards the aperture.

In some embodiments, the Kohler® type tank-to-bowl gasket can be coupled to a valve or pipe fitting comprising a circular body with a threaded aperture as shown. In some embodiments, the Kohler® gasket body can comprise an inner support ring encircling the gasket aperture that can support and/or seal a surface, such as one or more surfaces of the aforementioned valve or pipe fitting. In some embodiments, this inner support ring can help to center the Kohler® gasket onto a surface, component or assembly (e.g., such as a flush valve or pipe fitting). In some embodiments, the inner support ring can comprise an inner surface extending from an upper wall towards the aperture. In some embodiments, the inner surface can couple to an inner edge surface of the upper wall. In some embodiments, the inner edge surface and the inner surface of the inner support ring can be substantially perpendicular. In some other embodiments, the inner edge surface and the inner surface of the inner support ring can be non-perpendicular, where either one or both of the inner edge surface and/or the inner surface can be sloped away or towards the aperture.

In some embodiments, at least a portion of one or more inner surfaces of the valve or pipe fitting gasket body can seal against an outer surface of the valve or pipe fitting. In some embodiments, the outer lip of the valve or pipe fitting can couple with the upper wall and/or the inner support ring. In some embodiments, any of the coupled surfaces of the valve or pipe fitting gasket body and the valve or pipe fitting can comprises a fluid-tight seal.

In some embodiments, the Gerber® type tank-to-bowl gasket can comprise a structure that is similar to the standard type gasket of FIGS. 1, 5A-5B, except that the lower portion of the gasket body (opposite the sealing end) can is extended and/or the width is extended. In some embodiments, a similar or equivalent extension of the height and/or width can be achieved by an assembly of the previously described standard type tank-to-bowl gasket and the previously described Kohler® type tank-to-bowl gasket.

In some embodiments, a spacer or washer can be used in place of the trimmed Kohler® gasket body shown and/or in addition to the trimmed Kohler® gasket body. In some other embodiments, the Kohler® gasket design may be a tank-to-bowl gasket with three separate mounting bolt grommets that are separate from the gasket body. In this instance, trimming of the Kohler® gasket may not be required. In some embodiments, a non-conventional gasket comprising one or more dimensions of the Kohler® gasket with grommet portions removed is included with the kit. In some embodiments, a novel gasket that is manufactured and configured as an extension of the standard gasket is provided in the kit, where the width and height of the novel gasket results in a combined gasket that will seal a Gerber® tank-to-bowl interface.

In some embodiments, at least a portion of any of the gasket assemblies described herein can comprise a polymer-based material including one or more homopolymers, one or more copolymers, or mixtures thereof. In some embodiments, the material can comprise an elastomeric polymer such as rubber or silicone. In some embodiments, the rubber can be a natural rubber (e.g., such as natural gum rubber), a synthetic rubber, and/or combinations thereof. In some embodiments, the material can comprise a butyl or butylene rubber, ethylene propylene diene monomer rubber, neoprene rubber, nitrile rubber, silicone rubber, a polyurethane rubber, a fluoro-silicone, chloroprene rubber, nitrile rubber, or combinations thereof. In some embodiments, the material can include recycled rubber. In some other embodiments, the materials can comprise a silicone sponge or foam or a polyurethane sponge or foam.

In some embodiments, at least a portion of the material of any of the gasket structures described herein can comprise a polymer-based matrix material including a dispersed secondary material. For example, some embodiments include a material that comprises one or more polymers infused with (or including a dispersion of) filler elements, filler compounds, and/or filler mixtures. For example, in some embodiments, at least a portion of the material can comprise a polymer-based matrix material including filaments or particles dispersed in a matrix to form a composite material. For example, some embodiments include a filler that can comprise a fibrous material. In some embodiments, at least a portion of the filler can be oriented in a preferred direction. In some other embodiments, the material can comprise a fiber-filled matrix material including natural or synthetic filaments dispersed in a matrix to form a fiber composite material. Some embodiments include a filler material at least partially dispersed through at least a portion of the material. In some embodiments, the filler material can be amorphous or crystalline, organic or inorganic material. In some other embodiments, the particle size of the filler material can be between 1-10 microns. In some other embodiments, at least some portion of the filler material can be sub-micron. In some other embodiments, at least a portion of the filler can comprise a nano-sized particle filler material.

In some embodiments, any of the gasket structures disclosed herein can be fabricated using hand cutting, die cutting, laser cutting, and water jet cutting, molding, injection molding, reaction injection molding, or combinations thereof. For example, in some embodiments, some or all of the portions and features of the gaskets can be can be fabricated using hand cutting, die cutting, laser cutting, and water jet cutting, molding, injection molding, reaction injection molding, or combinations thereof.

Some embodiments described herein relate to gaskets for sealing flush valves or any other type of valve or valve fitting to a tank. Some embodiments include gaskets for sealing toilet flush valves onto toilet tanks. Some embodiments include at least one gasket that can be used for applications including sealing a flush valve to the bottom of a toilet tank. However, at least one or more of the embodiments described herein can be used in other applications requiring a seal between two orifices which need to be fluidly coupled. For example, some embodiments can be used to seal a fluidic coupling between a fluid carrying pipe and a fluid storage or holding tank. Some embodiments can be used to seal a fluidic coupling between two or more fluid carrying pipes.

Some embodiments provide a user with a two-piece hand tool or hand tool kit to engage various screw nuts and to facilitate removal and installation of fill valves, flush valves, and toilet tanks onto toilet bowls. For example, some embodiments include a box-end wrench that can be used to loosen or tighten different types of hex nuts on a flush valve shank. The box-end wrench can include multi-point openings varying in number based on universal or conventional nut designs that can engage a shaft with an outer surface shaped to at least partially complement the inner surface of the openings. For example, in some embodiments, the box-end wrench can include 6-point and/or 12-point hex openings.

Further, in some embodiments, the box-end wrench can include one or more structures to control a clearance space and/or off-set height. For example, in some embodiments, the box-end wrench can include extended walls to engage flush valve nuts of differing size. In some embodiments, the extended wall can enable the wrench head to fit inside certain tank-to-bowl gaskets that include a standing seal lip (e.g., Kohler® type tank-to-bowl gasket) where using standard wrench or channel lock pliers would interfere with and may damage the seal lip. In some embodiments, the box-end wrench can include one or more accessory functions. For example, some embodiments include a ruler on a handle of the box-end wrench head that can be used for valve and water level setting measurements. Kohler® is a registered trademark of Kohler Co., Kohler, Wis.

The detailed description is to be read with reference to the figures, in which like elements in different figures have like reference numerals in some embodiments. The figures, which are not necessarily to scale, depict selected embodiments and are not intended to limit the scope of the embodiments. Skilled artisans will recognize the examples provided herein have many useful alternatives that fall within the scope of embodiments of the disclosure.

Also, it is to be understood that the phraseology and terminology used herein is for description only and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The term "substantially" as used herein includes a range of ±5% of the units of measure associated therewith in some embodiments unless otherwise indicated. When comparing two structures using the term "substantially" the unit of measure is the same for both structures. The term "sealed" as used herein includes the ability to prevent the flow of water from an area of higher pressure to an area of lower pressure in some embodiments. The term "fastener" as used herein includes any conventional method of securing one physical component to another according to some embodiments. In some embodiments, example non-limiting fasteners include nuts, wing nuts, bolts, snap connections, glue, tape, compression fit connections, and/or the like.

Applicant, acting as their own lexicographer, has used and reserves the right to use relative terms (e.g., short, tall, etc.) as naming conventions (e.g., the short gasket, a tall gasket, etc.) both in the specification and the claims. Under such circumstances, the relative portion of the name shall not convey any other meaning other than to distinguish one physical structure from another according to some embodiments. For example, a "short gasket" only serves to identify a gasket type by name; however, other functional and/or structural limitations associated with the name "short gasket" may indeed establish that a "short gasket" is shorter than a "tall gasket," for example. Also, a reference to a "first gasket" a "second gasket" and/or a "third gasket" is a reference to the name of a generic gasket, and does not limit the first, second, or third (etc.) gasket to a conventional structure, and instead defines the presence of a structural difference between generic gaskets. However, the generic nature of the first, second, and/or third gasket does not exclude the generic gaskets from include features, configurations, and or structures associated with one or more conventional gaskets in some embodiments. Furthermore, acting as their own lexicographer, Applicant defines the use of and/or, in terms of "A and/or B," to mean one option could be "A and B" and another option could be "A or B." Such an interpretation is commiserate with ex parte Gross, where the Board established that "and/or" means element A alone, element B alone, or elements A and B together.

In some embodiments, the numbering provided in the disclosure as relates to method steps and/or product by process steps do not convey an order of the steps unless explicitly designated as an order.

It is to be understood that some embodiments are not limited in application to the details of construction and the arrangement of components set forth in the description or illustrated in the drawings. The products and processes described herein are capable of other embodiments and of being practiced or of being carried out in various ways. The features of some embodiments of one or more components can be combined with one or more other component embodiments without departing from the scope of the disclosure.

The description enables a person skilled in the art to make and use embodiments presented herein. Various modifications to the illustrated embodiments will be readily apparent to those skilled in the art, and the generic principles herein can be applied to other embodiments and applications without departing from the scope of the disclosure. Thus, some embodiments are not intended to be limited to embodiments shown, but are to be accorded the widest scope consistent with the principles and features disclosed herein.

We claim:

1. A toilet kit comprising:
a flush valve assembly, and
a flush valve tool;
wherein the flush valve tool comprises an aperture configured to allow a stem to pass therethrough;
wherein the flush valve tool is configured to rotate a first fastener and a second fastener; and
wherein the first fastener and the second fastener have different diameters.

2. The toilet kit of claim 1,
wherein the flush valve tool is configured to rotate the first fastener or the second fastener while the stem passes through the aperture.

3. The toilet kit of claim 2,
wherein the first fastener and the second fastener have different inner threaded diameters.

4. The toilet kit of claim 2,
wherein the first fastener and the second fastener have different outer diameters.

5. The toilet kit of claim 1,
wherein the flush valve tool is configured to rotate the fastener while at least a portion of the fastener is surrounded by an inner wall of a gasket.

6. The toilet kit of claim 1,
further comprising a ruler.

7. The toilet kit of claim 6,
wherein the ruler is a common, standard ruler.

8. The toilet kit of claim 6,
further comprising an instructions sheet/booklet;
wherein the ruler is a likeness of a ruler printed in the instructions sheet/booklet provided with the kit.

9. The toilet kit of claim 6,
further comprising packaging material;
wherein the ruler is a likeness of a ruler printed or marked on the packaging material.

10. The toilet kit of claim 6,
wherein the ruler is a likeness of a ruler printed or marked on the flush valve tool.

11. A toilet kit comprising:
a fill valve assembly, and
a fill valve tool;
wherein the fill valve tool is configured and arranged to rotate a fastener.

12. The toilet kit of claim 11,
wherein the fill valve tool is configured and arranged to rotate different sized fasteners.

13. The toilet kit of claim 12,
wherein at least one of the different sized fasteners is a wing nut.

14. The toilet kit of claim 11,
wherein the fill valve tool comprises at least one wing slot configured to engage with one or more wings of a wing nut.

15. The toilet kit of claim 14,
wherein the fill valve tool is configured to engage the one or more wing nut wings while a stem passes through a fill valve aperture.

16. The toilet kit of claim 11,
wherein the fill valve tool comprises an aperture configured and arranged to allow a stem to pass therethrough.

17. The toilet kit of claim 16,
wherein the fill valve tool is configured and arranged to rotate the fastener while a stem passes through the aperture.

18. The toilet kit of claim 17,
wherein the fill valve tool comprises a socket that comprises the aperture and the at least one wing slot.

19. A toilet kit comprising:
a fill valve assembly,
a flush valve assembly,
a flush valve tool,
a fill valve tool;
wherein the flush valve tool is configured to rotate a flush valve fastener; and
wherein the fill valve tool is configured to rotate a fill valve fastener.

20. The toilet kit of claim 19,
wherein the fill valve tool comprises at least one wing slot configured to engage with one or more wings of a wing nut.

21. The toilet kit of claim 20,
wherein the flush valve tool is configured to rotate the fastener while at least a portion of the fastener is surrounded by an inner wall of a gasket.

22. The toilet kit of claim 20,
wherein the flush valve tool is configured to rotated fasteners of different sizes; and
wherein the fill valve tool is configured to rotated fasteners of different sizes.

23. The toilet kit of claim 19,
further comprising a ruler.

24. The toilet kit of claim 23,
wherein the ruler is a common, standard ruler.

25. The toilet kit of claim 23,
further comprising an instructions sheet/booklet;
wherein the ruler is a likeness of a ruler printed in the instructions sheet/booklet provided with the kit.

26. The toilet kit of claim 23,
further comprising packaging material;
wherein the ruler is a likeness of a ruler printed or marked on the packaging material.

27. The toilet kit of claim 23,
wherein the ruler is a likeness of a ruler printed or marked on the flush valve tool.

28. The toilet kit of claim 23,
wherein the ruler is a likeness of a ruler printed or marked on the fill valve tool.

29. The toilet kit of claim 19,
further comprising a first gasket, a second gasket, and a packaging.

30. The toilet kit of claim 29,
wherein the packaging is configured and arranged to collect liquid.

31. The toilet kit of claim 30,
further comprising a ruler.

32. The toilet kit of claim 31,
further comprising a handle assembly.

33. The toilet kit of claim 31,
wherein the ruler is a common, standard ruler, or measuring tape.

34. The toilet kit of claim 31,
wherein the ruler is a likeness of a ruler printed in a instructions sheet/booklet provided with the toilet kit.

35. The toilet kit of claim 31,
wherein the ruler is a likeness of a ruler printed or marked on the packaging material.

36. The toilet kit of claim 30,
further comprising a handle assembly.
37. A toilet kit comprising:
a first gasket and a second gasket;
wherein the first gasket is configured and arranged to seal a first tank-to-bowl interface;
wherein the second gasket is configured and arranged to seal a second tank-to-bowl interface;
wherein the first tank-to-bowl interface and/or the second tank-to-bowl interface is a conventional toilet tank-to-bowl interface;
wherein the conventional toilet tank-to-bowl interface is configured and arranged to enable the flow of water from a toilet tank to a toilet bowl during a toilet flush;
wherein the first gasket is configured and arranged to surround the stem of a flush valve; and
wherein the second gasket is configured and arranged to surround the stem of the flush valve; and
wherein the first gasket is configured and arranged to fit inside the second gasket for use as a synergistic gasket.
38. The toilet kit of claim 37,
wherein the synergistic gasket is configured and arranged to seal a third tank-to-bowl interface;
wherein the first gasket and/or the second gasket cannot seal the third tank-to-bowl interface individually.
39. A toilet kit comprising:
a first gasket,
a second gasket, and
a packaging.
40. The toilet kit of claim 39,
wherein the first gasket and the second gasket are connected to the packaging.
41. The toilet kit of claim 40,
wherein the first gasket is configured and arranged to seal a first conventional toilet tank- to-bowl interface; and
wherein the second gasket is configured and arranged to seal a second conventional toilet tank-to-bowl interface; and
wherein the first and second conventional toilet tank-to-bowl interfaces are each configured and arranged to enable the flow of water from a conventional toilet tank to a conventional toilet bowl during a toilet flush.
42. The toilet kit of claim 41,
wherein the first gasket is configured and arranged to fit inside the second gasket for use as a synergistic gasket.
43. The toilet kit of claim 42,
wherein the synergistic gasket is configured and arranged to seal a third tank-to-bowl interface; and
wherein the first gasket and/or the second gasket cannot seal the third tank-to-bowl interface individually.
44. The toilet kit of claim 39,
wherein a first gasket portion of the first gasket is configured and arranged to be surrounded by a second gasket portion of the second gasket.
45. The toilet kit of claim 39,
wherein a parameter of a first outer wall of the first gasket is configured to contact the parameter of a second inner wall of the second gasket.
46. The toilet kit of claim 39,
wherein a first parameter of a first bottom surface of the first gasket is configured to contact a second parameter of a second lower wall of the second gasket.
47. The toilet kit of claim 39,
wherein the packaging is configured and arranged to collect liquid.
48. The toilet kit of claim 39,
further comprising a flush valve assembly, and a fill valve assembly.
49. The toilet kit of claim 48,
wherein the packaging is configured and arranged to collect liquid.
50. The toilet kit of claim 49,
further comprising a ruler.
51. The toilet kit of claim 50,
wherein the ruler is a common, standard ruler, or measuring tape.
52. The toilet kit of claim 50,
wherein the ruler is a likeness of a ruler printed in the instructions sheet/booklet provided with the toilet kit.
53. The toilet kit of claim 50,
wherein the ruler is a likeness of a ruler printed or marked on the packaging.
54. A method of assembling a toilet kit comprising:
providing a first gasket and a second gasket;
connecting the first gasket and the second gasket to a package.
55. The assembly method of claim 54,
wherein the first gasket is configured and arranged to seal a first conventional toilet tank-to-bowl interface; and
wherein the second gasket is configured and arranged to seal a second conventional toilet tank-to-bowl interface;
wherein the first gasket cannot seal the second conventional tank-to-bowl interface and/or the second gasket cannot seal the first conventional tank-to-bowl interface
wherein the first and second conventional toilet tank-to-bowl interfaces are each configured and arranged to enable the flow of water from a conventional toilet tank to a conventional toilet bowl during a toilet flush.
56. The assembly method of claim 54,
wherein the first gasket is configured and arranged to fit inside the second gasket for use as a synergistic gasket.
57. The assembly method of claim 56,
wherein the synergistic gasket is configured and arranged to seal a third tank-to-bowl interface; and
wherein the first gasket and/or the second gasket cannot seal the third tank-to-bowl interface individually.
58. A flush valve tool comprising:
a tool body, and
an aperture surrounded by the tool body;
wherein the flush valve tool is configured to rotate a first fastener while a stem of a flush valve passes through the aperture.
59. The flush valve tool of claim 58,
wherein the flush valve tool is configured to rotate the first fastener or a second fastener while the stem of the flush valve passes through the aperture.
60. The flush valve tool of claim 58,
wherein the flush valve tool is configured to rotate the first fastener while at least a portion of the fastener is surrounded by an inner wall of a gasket.
61. The flush valve tool of claim 58,
further comprising a ruler.
62. The flush valve tool of claim 61,
wherein the ruler is a common, standard ruler.
63. A flush valve tool comprising:
a tool body, and
an aperture surrounded by the tool body;
wherein the flush valve tool is configured to rotate the first fastener or a second fastener while the stem of the flush valve passes through the aperture; and wherein the first fastener and the second fastener have different diameters.

64. The flush valve tool of claim 63, wherein the first fastener and the second fastener have different inner threaded diameters.

65. The flush valve tool of claim 6, wherein the first fastener and the second fastener have different outer diameters.

66. A flush valve tool comprising:
a tool body, and
an aperture surrounded by the tool body;
wherein the flush valve tool is configured to rotate a first fastener while a stem of a flush valve passes through the aperture;
wherein the flush valve tool further comprises a ruler;
wherein the ruler is a common, standard ruler; and
wherein the ruler is a likeness of a ruler printed or marked on a packaging material.

67. A fill valve tool comprising:
a tool body, and
a first aperture surrounded by the tool body;
wherein the fill valve tool is configured and arranged to rotate a first fastener while a stem of a fill valve passes through the aperture.

68. The fill valve tool of claim 67,
wherein the fill valve tool is configured to rotate the first fastener or a second fastener while the stem of the flush valve passes through the first aperture; and
wherein the first fastener comprises a different shape than the second fastener.

69. The fill valve tool of claim 68,
wherein the first fastener is a hexagonal nut.

70. The fill valve tool of claim 68,
wherein the second fastener is a wing nut.

71. The fill valve tool of claim 68,
further comprising a second aperture;
wherein the flush valve tool is configured to rotate a third fastener or a fourth fastener while the stem of the flush valve passes through the second aperture; and
wherein the third fastener comprises a different shape than the fourth fastener.

72. The fill valve tool of claim 67,
wherein the fill valve tool comprises a socket that comprises the aperture.

73. The fill valve tool of claim 67,
wherein the fill valve tool comprises at least one wing slot configured to engage with one or more wings of a wing nut.

74. The fill valve tool of claim 67,
further comprising a ruler.

75. The fill valve tool of claim 67,
wherein the ruler is a common, standard ruler.

76. A toilet kit comprising:
a flush valve tool,
a fill valve tool, and
a packaging;
wherein the flush valve tool and the fill valve tool are contained in the packaging; and
wherein the packaging is configured and arranged to collect liquid.

\* \* \* \* \*